US008102872B2

(12) United States Patent
Spindola et al.

(10) Patent No.: US 8,102,872 B2

(45) Date of Patent: Jan. 24, 2012

(54) METHOD FOR DISCONTINUOUS TRANSMISSION AND ACCURATE REPRODUCTION OF BACKGROUND NOISE INFORMATION

(75) Inventors: Serafin Diaz Spindola, San Diego, CA (US); Peter J. Black, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1170 days.

(21) Appl. No.: 11/123,478

(22) Filed: May 5, 2005

(65) Prior Publication Data

US 2006/0171419 A1 Aug. 3, 2006

Related U.S. Application Data

(60) Provisional application No. 60/649,192, filed on Feb. 1, 2005.

(51) Int. Cl.
*H04L 12/403* (2006.01)

(52) U.S. Cl. ........................................................ 370/450

(58) Field of Classification Search .................. 370/230, 370/235, 320, 335, 338, 342, 441, 450, 454, 370/459, 477

See application file for complete search history.

(56) References Cited

U.S. PATENT DOCUMENTS 5,778,338 A 7/1998 Jacobs et al.
6,138,040 A * 10/2000 Nicholls et al. ............ 455/569.1
6,463,080 B1 * 10/2002 Wildey .......................... 370/508
6,718,298 B1 * 4/2004 Judge ............................ 704/215
6,907,030 B1 * 6/2005 Bladsjo et al. ................ 370/349
7,103,025 B1 * 9/2006 Choksi ........................... 370/335
2002/0101844 A1 * 8/2002 El-Maleh et al. ............. 370/342
2002/0188445 A1 * 12/2002 Li ................................ 704/233
2003/0016643 A1 * 1/2003 Hamalainen et al. ......... 370/336
2003/0091182 A1 5/2003 Marchok et al.
2004/0006462 A1 * 1/2004 Johnson ........................ 704/214
2005/0027520 A1 * 2/2005 Mattila et al. ................. 704/228
2006/0149536 A1 * 7/2006 Li ................................ 704/215

FOREIGN PATENT DOCUMENTS

JP 2001350488 A 12/2001

(Continued)

OTHER PUBLICATIONS

Yavuz, Mehmet, et al. "VoIP over cdma2000 1xEV-DO Revision A", IEEE Commun Mag; IEEE Communications Magazine Feb. 2006, vol. 44 No. 2, Feb. 2006, pp. 88-95.

(Continued)

*Primary Examiner* — Ricky Ngo
*Assistant Examiner* — Wei-Po Kao
(74) *Attorney, Agent, or Firm* — Larry J. Moskowitz; Heejong Yoo

(57) ABSTRACT

The present invention comprises a method of communicating background noise comprising the steps of transmitting background noise, blanking subsequent background noise data rate frames used to communicate the background noise, receiving the background noise and updating the background noise. In another embodiment, the present invention comprises an apparatus for communicating background noise comprising a vocoder, at least one smart blanking apparatus operably connected to the vocoder, a de jitter buffer operably connected to the smart blanker; and a network stack operably connected to the input of the de jitter buffer and the an output of the smart blanking apparatus.

26 Claims, 22 Drawing Sheets

FOREIGN PATENT DOCUMENTS

| | | | |
|---|---|---|---|
| JP | 2004094132 | A | 3/2004 |
| WO | WO 2004/034376 | | 4/2004 |
| WO | WO2004034376 | A2 | 4/2004 |

OTHER PUBLICATIONS

Benyassine A., et al. "*ITU-T Recommendation G. 729 Annex B: A Silence Compression Scheme for Use with g.729 Optimized for V.70 digital Simultaneous Voice and Data Applications*", IEEE Communications Magazine, vol. 35, No. 9, Sep. 1997.

Yavuz, Mahmet, et al., "*VoIP over cdma2000 1xEV-DO Revision A*", IEEE Communications Magazine, vol. 44, No. 2, Feb. 2006.

International Preliminary Report on Patentability—PCT/US06/003640, The International Bureau of WIPO—Geneva, Switzerland—Aug. 7, 2007.

International Search Report—PCT/US06/003640, International Search Authority—European Patent Office—Sep. 7, 2006.

Written Opinion—PCT/US06/003640, International Search Report—European Patent Office—Sep. 7, 2006.

* cited by examiner

METHOD FOR DISCONTINUOUS TRANSMISSION AND ACCURATE REPRODUCTION OF BACKGROUND NOISE INFORMATION

CLAIM OF PRIORITY UNDER 35 U.S.C. §119

This application claims benefit of U.S. Provisional Application No. 60/649,192 entitled "Method for Discontinuous Transmission and Accurate Reproduction of Background Noise Information" filed Feb. 1, 2005, which is hereby incorporated by reference.

BACKGROUND

1. Field

The present invention relates generally to network communications. More specifically, the present invention relates to a novel and improved method and apparatus to improve voice quality, lower cost and increase efficiency in a wireless communication system while reducing bandwidth requirements.

2. Background

CDMA vocoders use continuous transmission of 1/8 frames at a known rate to communicate background noise information. It is desirable to drop or "blank" most of these 1/8 frames to improve system capacity while keeping speech quality unaffected. There is therefore a need in the art for a method to properly select and drop frames of a known rate to reduce the overhead required for communication of the background noise.

SUMMARY

In view of the above, the described features of the present invention generally relate to one or more improved systems, methods and/or apparatuses for communicating background noise.

In one embodiment, the present invention comprises a method of communicating background noise comprising the steps of transmitting background noise, blanking subsequent background noise data rate frames used to communicate the background noise, receiving the background noise and updating the background noise.

In another embodiment, the method of communicating background noise further comprises the step of triggering an update of the background noise, when the background noise changes, by transmitting a new prototype rate frame.

In another embodiment, the method of communicating background noise further comprises the step of triggering by: filtering the background noise data rate frame, comparing an energy of the background noise data rate frame to an average energy of the background noise data rate frames, and transmitting an update background noise data rate frame, if a difference exceeds a threshold.

In another embodiment, the method of communicating background noise further comprises the step of triggering by: filtering the background noise data rate frame, comparing a spectrum of the background noise data rate frame to an average spectrum of the background noise data rate frames, and transmitting an update background noise data rate frame, if a difference exceeds a threshold.

In another embodiment, the present invention comprises an apparatus for communicating background noise comprising a vocoder having at least one input and at least one output, wherein the vocoder comprises a decoder having at least one input and at least one output and an encoder having at least one input and at least one output, at least one smart blanking apparatus having a memory and at least one input and at least one output, wherein a first of the at least one input is operably connected to the at least one output of the vocoder and the at least one output is operably connected to the at least one input of the vocoder, a de-jitter buffer having at least one input and at least one output, wherein the at least one output is operably connected to a second of the at least one input of the smart blanker; and a network stack having at least one input and at least one output, wherein the at least one input is operably connected to the at least one input of the de-jitter buffer and the at least one input is operably connected to the at least one output of the smart blanking apparatus.

In another embodiment, the smart blanking apparatus is adapted to execute a process stored in memory. The process includes instructions to transmit the background noise, blank subsequent background noise data rate frames used to communicate the background noise, receive the background noise, and update the background noise.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION

Figure 1:
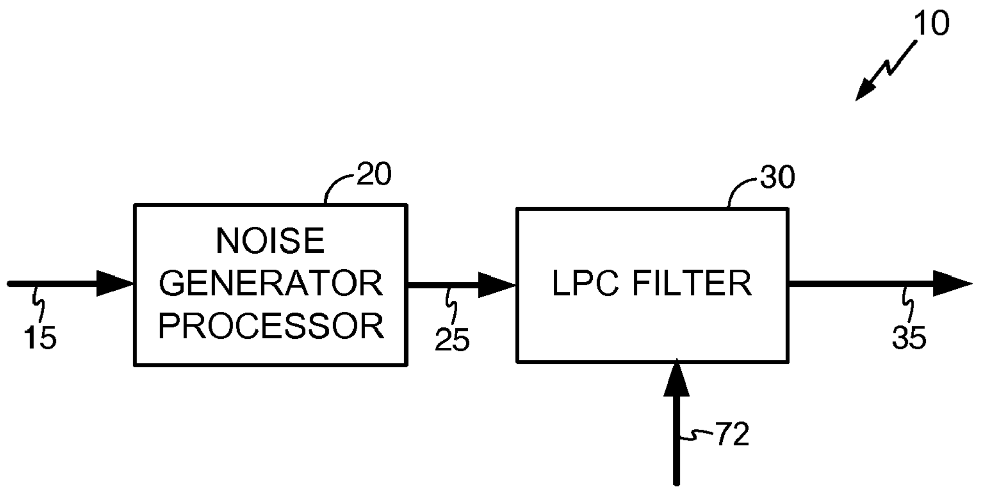
FIG. 1 is a block diagram of a background noise generator.

The word "illustrative" is used herein to mean "serving as an example, instance, or illustration." Any embodiment described herein as "illustrative" is not necessarily to be construed as preferred or advantageous over other embodiments.

During a full duplex conversation, there are many instances when at least one of the parties is "silent." During these "silence" intervals, the channel communicates background noise information. Proper communication of the background noise information is a factor that affects the voice quality perceived by the parties involved in a conversation. In IP based communications, when one party goes silent, a packet may be used to send messages to the receiver indicating that the speaker has gone silent and that background noise should be reproduced or played back. The packet may be sent at the beginning of every silence interval. CDMA vocoders use continuous transmission of 1/8 rate frames at a known rate to communicate background noise information.

Landline or wireline systems send most speech data because there are not as many constraints on bandwidth as with other systems. Thus, data may be communicated by sending full rate frames continuously. In wireless communication systems, however, there is a need to conserve bandwidth. One way to conserve bandwidth in a wireless system is to reduce the size of the frame transmitted. For example, many CDMA systems send 1/8 rate frames continuously to communicate background noise. The 1/8 rate frame acts as a silence indicator frame (silence frame). By sending a small frame, as opposed to a full or half rate frame, bandwidth is saved.

The present invention comprises an apparatus and method of conserving bandwidth comprising dropping or "blanking" "silence" frames. Dropping or "blanking" most of these 1/8 rate silence (or background noise) frames improves system capacity while maintaining speech quality at acceptable levels. The apparatus and method of the present invention is not limited to 1/8 rate frames, but may be used to select and drop frames of a known rate used to communicate background noise to reduce the overhead required for communication of the background noise. Any rate frame used to communicate background noise, may be known as a background noise rate frame and may be used in the present invention. Thus, the present invention may be used with any size frame as long as it is used to communicate background noise. Furthermore, if the background noise changes in the middle of a silence interval, the present smart blanking apparatus updates the communication system to reflect the change in background noise without significantly affecting speech quality.

In CDMA communications, a frame of known rate may be used for encoding the background noise when the speaker goes silent. In an illustrative embodiment, a 1/8 rate frame is used in a Voice over Internet Protocol (VoIP) system over High Data Rate (HDR). HDR is described by Telecommunications Industry Association (TIA) standard IS-856, and is also known as CDMA2000 1xEV-DO. In this embodiment, a continuous train of 1/8 rate frames is sent every 20 milliseconds (msec) during a silence period. This differs from full rate (rate 1), half rate (rate 1/2) or quarter rate (rate 1/4) frames, which may be used to transmit voice data. Although the 1/8 rate packet is relatively small, i.e., has fewer bits, compared to a full rate frame, packet overhead in a communication system may still be considerable. This is especially true since a scheduler may not differentiate between voice packet rates. A scheduler allocates system resources to the mobile stations to provide efficient utilization of the resources. For example, the maximum throughput scheduler maximizes cell throughput by scheduling the mobile station that is in the best radio condition. A round-robin scheduler allocates the same number of scheduling slots to the system mobile stations, one at a time. The proportional fair scheduler assigns transmission time to mobile stations in a proportionally (user radio condition) fair manner. The present method and apparatus can be used with many types of schedulers and is not limited to one particular scheduler. Since a speaker is typically silent for about 60% of a conversation, dropping most of these 1/8 rate frames used to transmit background noise during the silence periods provides a system capacity gain by reducing the total amount of data bits transmitted during these silence periods.

The reason that the speech quality is mostly unaffected comes from the fact that the smart blanking is performed in such a way that background noise information is updated when required. In addition to enhanced capacity, using 1/8 rate frame smart blanking reduces the overall cost of transmission because bandwidth requirements are lessened. All these improvements are done while minimizing the effect on the perceived voice quality.

The smart blanking apparatus of the present invention may be used with any system in which packets are transferred, such as many voice communication systems. This includes but is not limited to wireline systems communicating with other wireline systems, wireless systems communicating with other wireless systems, and wireline systems communicating with wireless systems.

Production of Background Noise

In an illustrative embodiment described herein, there are two components to background noise generation. These components include the energy level or volume of the noise and the spectral frequency characteristics, or "color" of the noise. FIG. 1 illustrates an apparatus which generates background noise 35, a background noise generator 10. Signal energy 15 is input to a noise generator 20. The noise generator 20 is a small processor. It executes software which results in it outputting white noise 25 in the form of a random sequence of numbers whose average value is zero. This white noise is input to a Linear Prediction Coefficient (LPC) filter or Linear Predictive Coding filter 30. Also input to the LPC filter 30 are the LPC coefficients 72. These coefficients 72 can come from a codebook entry 71. The LPC filter 30 shapes the frequency characteristics of the background noise 35. The background noise generator 10 is a generalization on all systems which transmit background noise 35 as long as they use volume and frequency to represent background noise 35. In a preferred embodiment, the background noise generator 10 is located in a relaxed code-excited linear predictive (RCELP) decoder 40 which is located in the decoder 50 of a vocoder 60. See FIG.

2 which is a top level view of a decoder 50 having a RCELP decoder 40 which uses 1/8 rate frames 70 to play noise 35.

Figure 2:
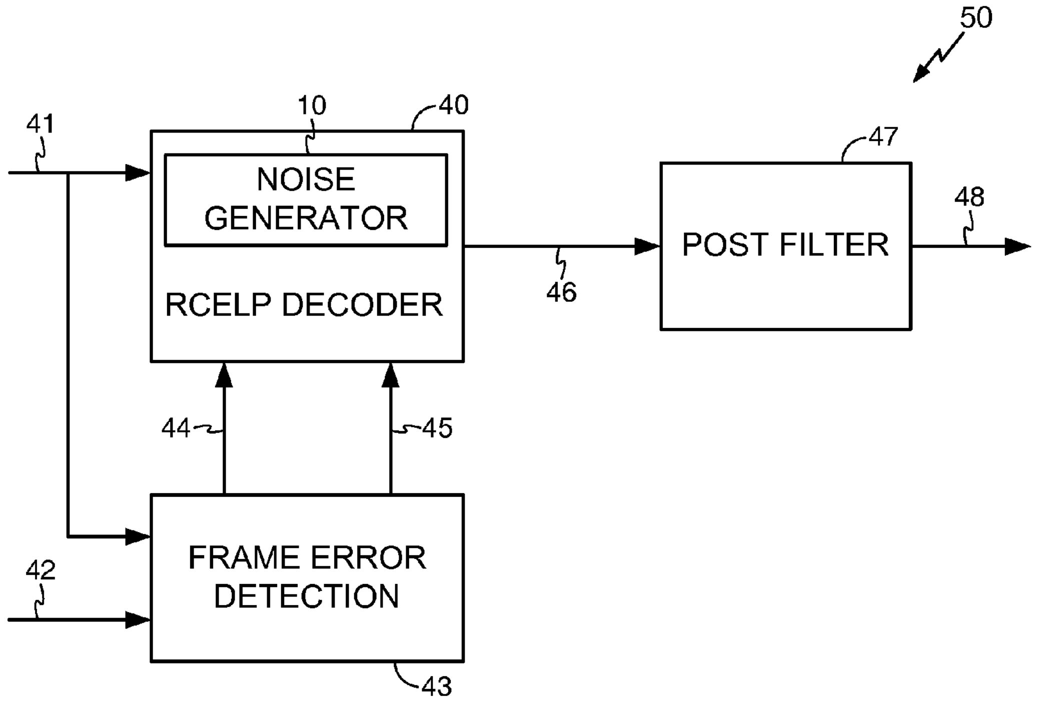
FIG. 2 is a top level view of a decoder which uses 1/8 rate frames to play noise.

In FIG. 2, a packet frame 41 and a packet type signal 42 are input to a frame error detection apparatus 43. The packet frame 41 is also input to the RCELP decoder 40. The frame error detection apparatus 43 outputs a rate decision signal 44 and a frame erasure flag signal 45 to the RCELP decoder 40. The RCELP decoder 40 outputs a raw synthesized speech vector 46 to a post filter 47. The post filter 47 outputs a post filtered synthesized speech vector signal 48.

This method of generating background noise is not limited to CDMA vocoders. A variety of other speech vocoders such as Enhanced Full Rate (EFR), Adaptive Multi Rate (AMR), Enhanced Variable Rate CODEC (EVRC), G.727, G.728 and G.722 may apply this method of communicating background noise.

Although there are an infinite number of energy levels and spectral frequency characteristics for the background noise 89 during a silence interval and for the voice during a conversation, the background noise 89 during silence intervals can usually be described by a finite (relatively small) number of values. To reduce the required bandwidth for communication of background noise information, the spectral and energy noise information for a particular system may be quantized and encoded into codebook entries 71, 73 stored in one or more codebooks 65. Thus, the background noise 35 appearing during a silence interval can usually be described by a finite number of the entries 71, 73 in these codebooks 65. For example, a codebook entry 73 used in an Enhanced Variable Rate Codec (EVRC) system may contain 256 different 1/8 rate constants for power. Typically, any noise transmitted within an EVRC system will have a power level corresponding to one of these 256 values. Furthermore, each number decodes into 3 power levels, one for each subframe inside an EVRC frame. Similarly, an EVRC system will contain a finite amount of entries 71 which correspond to the frequency spectrums associated with encoded background's noise 35.

Figure 3:
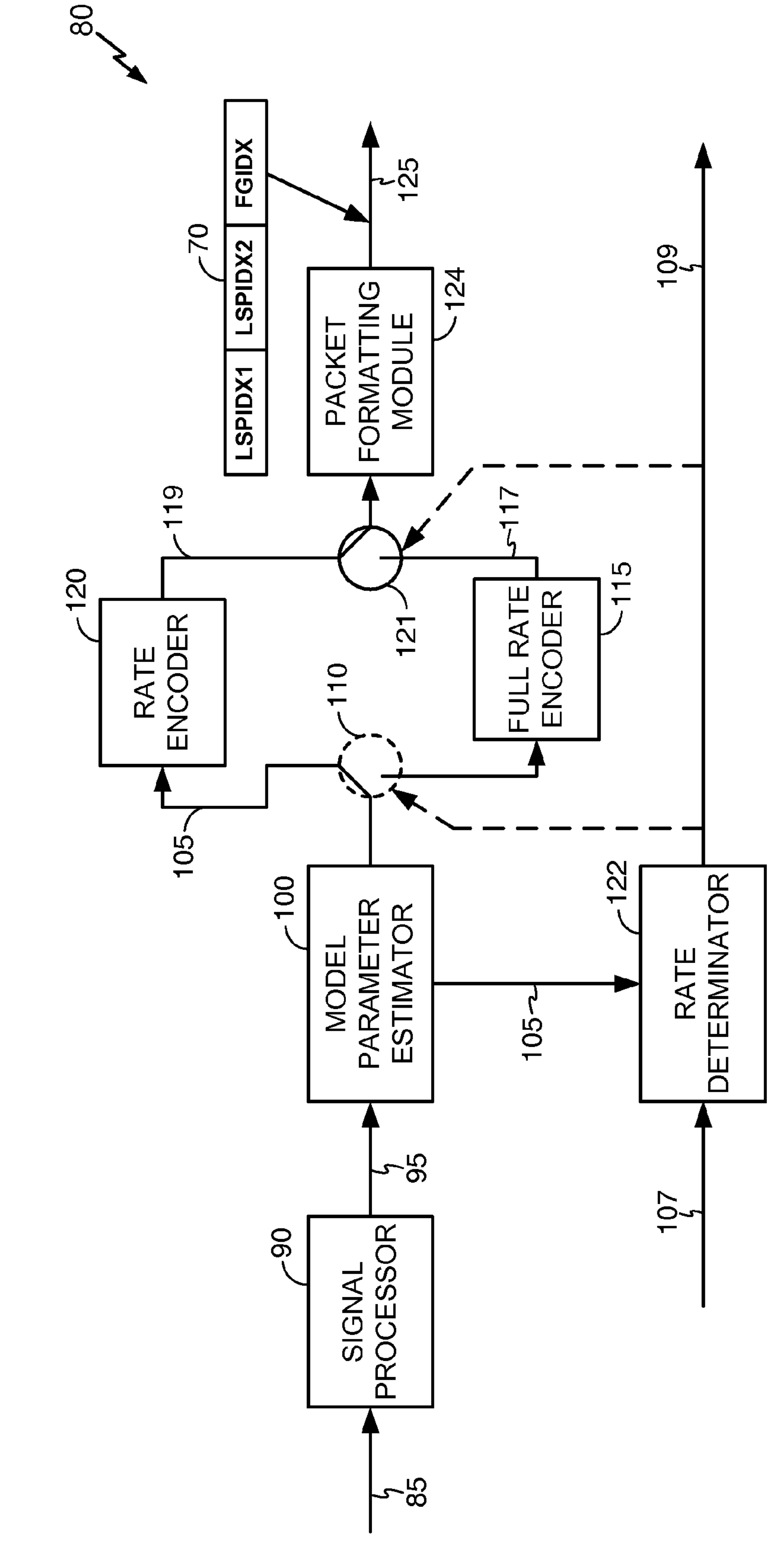
FIG. 3 illustrates one embodiment of an encoder.

In one embodiment, an encoder 80 located in the vocoder 60 may generate the codebook entries 71, 73. This is illustrated in FIG. 3. The codebook entry 71, 73 may eventually be decoded to a close approximation of the original values. One of ordinary skill in the art will also recognize that the use of energy volume 15 and frequency "color" coefficients 72 in codebooks 65, for noise encoding and reproduction, may be extended to several types of vocoders 60, since many vocoders 60 use an equivalent mode to transmit noise information.

FIG. 3 illustrates one embodiment of an encoder 80 which may be used in the present invention. In FIG. 3, two signals are input to the encoder 80, the speech signal 85 and an external rate command 107. The speech signal or pulse code modulated (PCM) speech samples (or digital frames) 85 are input to a signal processor 90 in the vocoder 60 which will both high pass filter and adaptive noise suppress filter the signal 85. The processed or filtered pulse code modulated (PCM) speech samples 95 are input to a model parameter estimator 100 which determines whether voice samples are detected. The model parameter estimator 100 outputs model parameters 105 to a first switch 110. Speech may be defined as a combination of voice and silence. If voice (active speech) samples are detected, the first switch 110 routes the model parameters 105 to a full or half rate encoder 115 and the vocoder 60 outputs the samples in full or half rate frames 117 in a formatted packet 125.

If the rate determinator 122, with input from the model parameter estimator 100, decides to encode a silence frame, the first switch 110 routes the model parameters 105 to a 1/8 rate encoder 120 and the vocoder 60 outputs 1/8 rate frame parameters 119. A packet formatting module 124 contains the apparatus which puts those parameters 119 into a formatted packet 125. If a 1/8 rate frame 70 is generated as illustrated, the vocoder 60 may output a packet 125 containing codebook entries corresponding to energy (FGIDX) 73, or spectral energy values (LSPIDX1 or LSPIDX2) 71 of the voice or silence sample 85.

A rate determinator 122 applies a voice activity detection (VAD) method and rate selection logic to determine what type of packet to generate. The model parameters 105 and an external rate command signal 107 are input to the rate determinator 122. The rate determinator 122 outputs a rate decision signal 109.

The 1/8 Rate Frame

Figure 4:
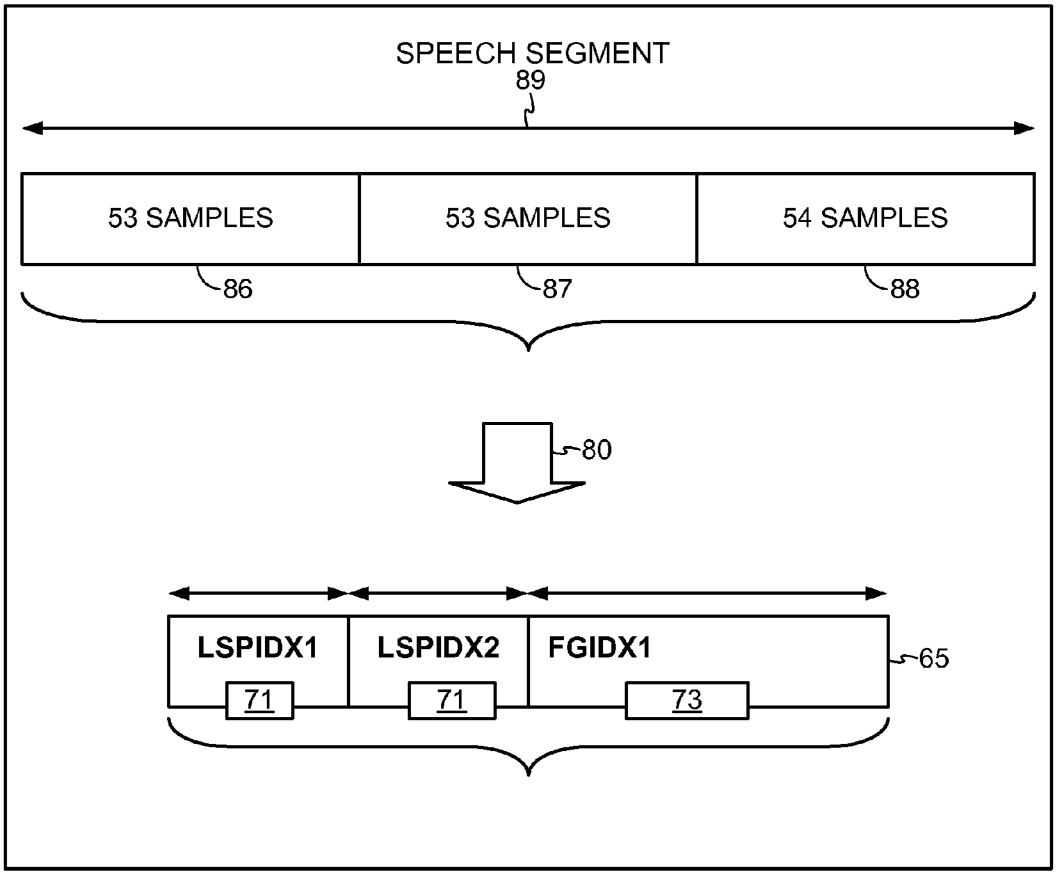
FIG. 4 illustrates a 1/8 rate frame containing three codebook entries, FGIDX, LSPIDX1, and LSPIDX2.

In FIG. 4, 160 PCM samples represents a speech segment 89 which in this case is produced from sampling 20 milliseconds of background noise. The 160 PCM samples are divided into three blocks, 86, 87 and 88. Blocks 86 and 87 are 53 PCM samples long, while block 88 is 54 PCM samples long. The 160 PCM samples and, thus, the 20 milliseconds of background noise 89, can be represented by a 1/8 rate frame 70. In an illustrative embodiment, a 1/8 rate frame 70 may contain up to sixteen bits of information. However, the number of bits can vary depending upon the particular use and requirements of the system. An EVRC vocoder 60 is used in an exemplary embodiment to distribute the sixteen bits into three codebooks 65. This is illustrated in FIG. 4. The first eight bits, LSPIDX1 (4 bits) and LSPIDX2 (4 bits), represent the frequency content of the encoded noise 35, e.g., the spectral information required for reproduction of the background noise 35. The second set of eight bits, FGIDX (8 bits), represents the volume content of the noise 35, e.g., the energy required for the reproduction of the background noise 35. Since only a finite number of potential energy volumes will be contained in a codebook, each of these volumes can be represented by an entry 73 in the codebook. The entry 73 of some embodiments is eight bits long. Similarly, the spectral frequency information can be represented by two entries 71 from two different codebooks. Each of these two entries 71 is preferably 4 bits long in size. Thus, the sixteen bits of information are the codebook entries 71, 73 used to represent the volume and frequency characteristics of the noise 35.

Figure 5A:
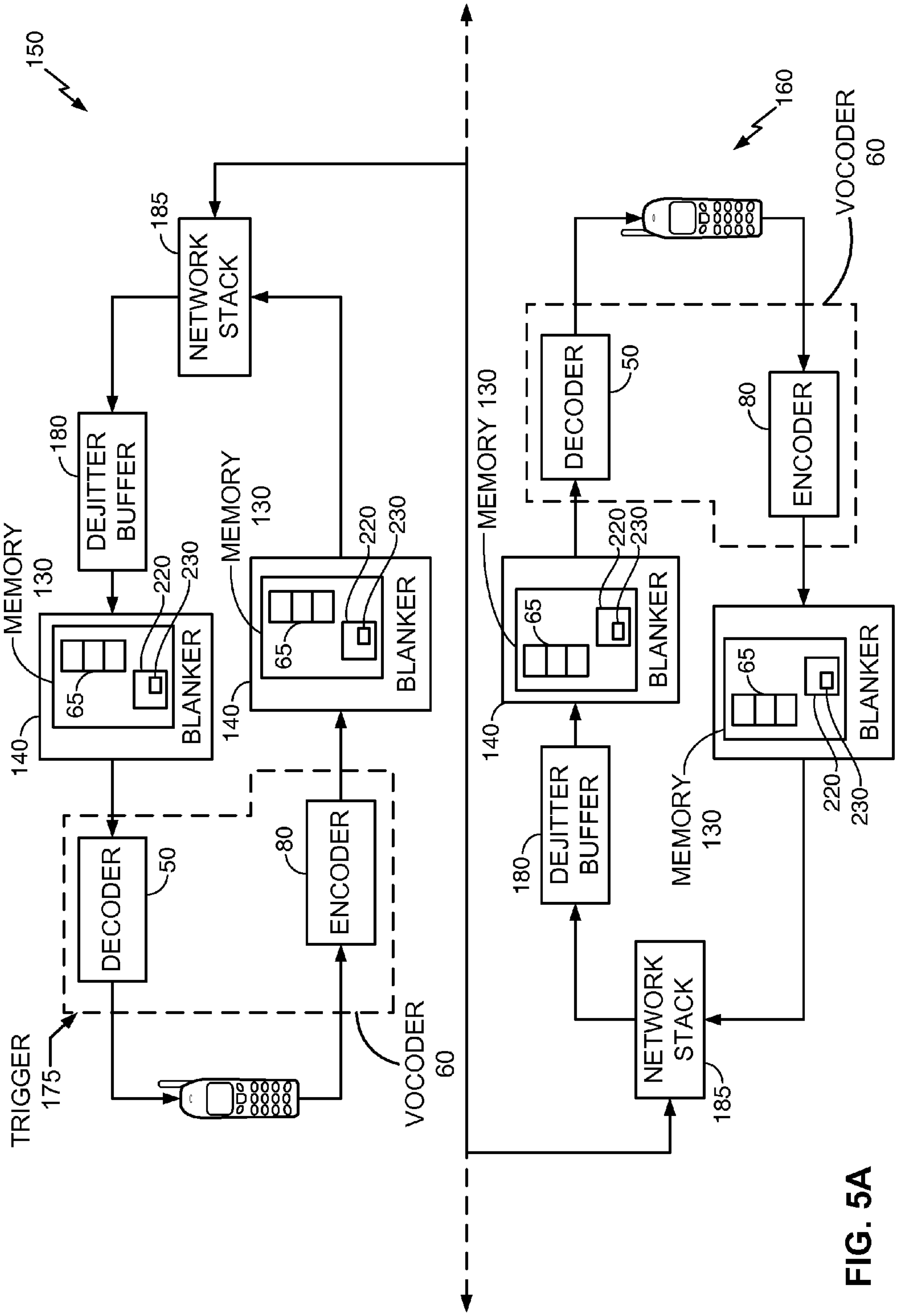
FIG. 5A is a block diagram of a system which uses smart blanking.

In the illustrated embodiment shown in FIG. 4, the FGIDX codebook entry 73 contains energy values used to represent the energy in the silence samples. The LSPIDX1 codebook entry 71 contains the "low frequency" spectral information and the LSPIDX2 codebook entry 71 contains the "high frequency" spectral information used to represent the spectrum in the silence samples. In another embodiment, the codebooks are stored in memory 130 located in the vocoder 60. The memory 130 can also be located outside the vocoder 60. In an alternative embodiment, the memory 130 containing the codebooks may be located in the smart blanking apparatus or smart blanker 140. This is illustrated in FIG. 5*a*. Since the values in the codebooks don't change, the memory 130 can be ROM memory, although any of a number of different types of memory may be used such as RAM, CD, DVD, magnetic core, etc.

Blanking 1/8 Rate Frames

In an exemplary embodiment, a method of blanking 1/8 rate frames 70 may be divided between the transmitting device 150 and the receiving device 160. This is shown in FIG. 5*a*. In this embodiment, the transmitter 150 selects the best representation of the background noise and transmits this information to the receiver 160. The transmitter 150 tracks changes in the sampled input background noise 89 and uses a trigger 175 (or other form of notification) to determine when to update the noise signal 70 and communicates these changes to the receiver 160. The receiver 160 tracks the state of the conversation (talking, silence) and produces "accurate" background noise 35 with the information provided by the transmitter 150. The method of blanking 1/8 rate frames 70 may be implemented in a variety of ways, such as, for example, by using logic circuitry, analog and/or digital electronics, computer executed instructions, software, firmware, etc.

FIG. 5A also illustrates an embodiment where the decoder 50 and the encoder 80 may be operably coupled in a single apparatus. A dotted line has been placed around the decoder 50 and the encoder 80 to represent that both devices are found within the vocoder 60. The decoder 50 and encoder 80 can also be located in separate apparatuses. A decoder 50 is a device for the translation of a signal from a digital representation into a synthesized speech signal. An encoder 80 translates a sampled speech signal into a compressed and/or packed digital representation. In a preferred embodiment, the encoder 80 converts sampled speech or a PCM representation into a vocoder packet 125. One such encoded representation can be a digital representation. In addition, in EVRC systems, many vocoders 60 have a high band pass filter with a cut off frequency of around 120 Hz located in the encoder 80. The cutoff frequency can vary with different vocoders 60.

Figure 5B:
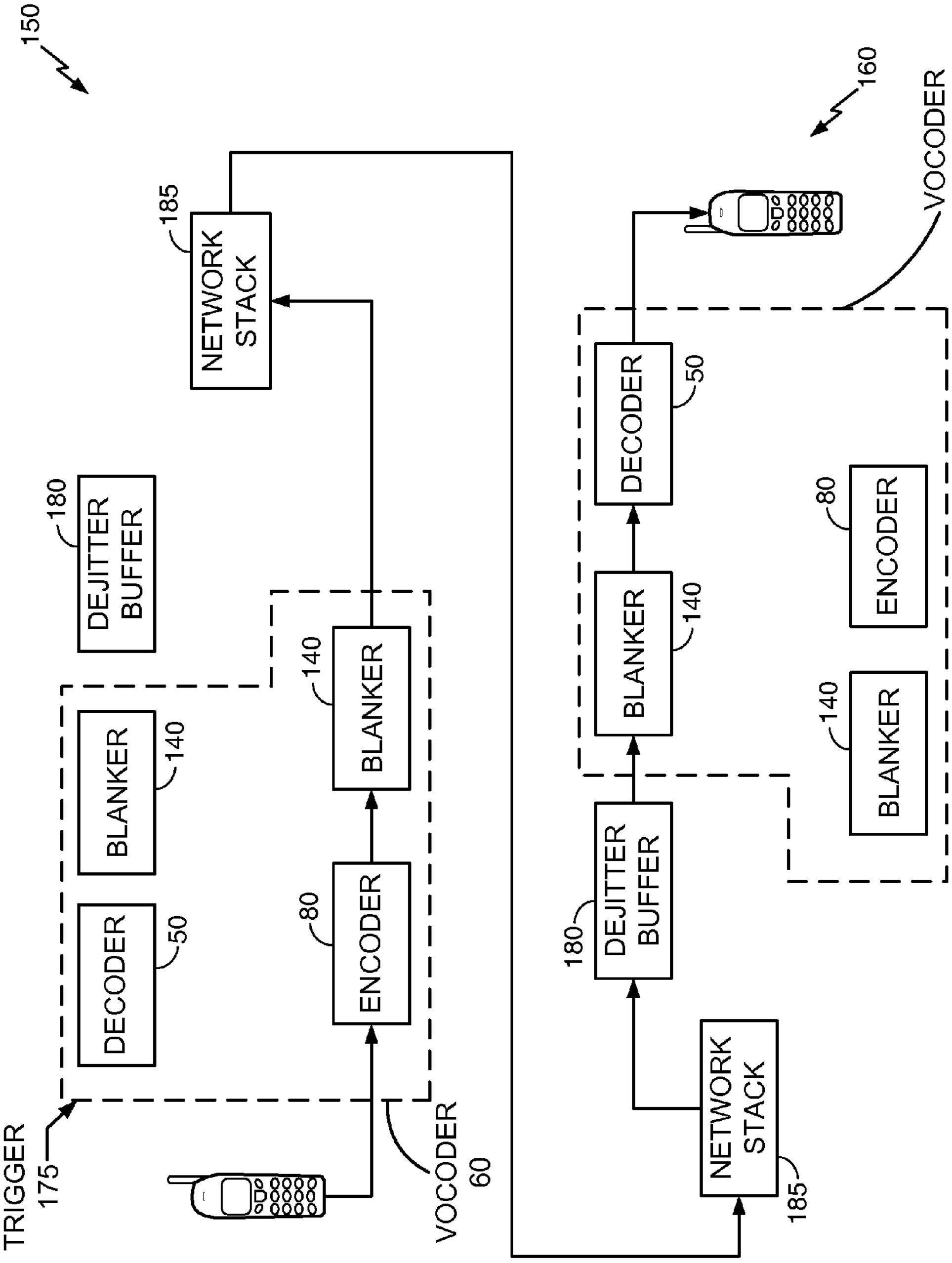
FIG. 5B is a block diagram of a system which uses smart blanking where the smart blanking apparatus is integrated into the vocoder.

Furthermore, in FIG. 5A, the smart blanking apparatus 140 is located outside the vocoder 60. However, in another embodiment, the smart blanking apparatus 140 can be found inside the vocoder 60. See FIG. 5B. Thus, the blanking apparatus 140 can be integrated with the vocoder 60 to be part of the vocoder apparatus 60 or located as a separate apparatus. As shown in FIG. 5A, the smart blanking apparatus 140 receives voice and silence packets from the de jitter buffer 180. The de-jitter buffer 180 performs a number of functions, one of which is to put the speech packets in order as they are received. A network stack 185 operably couples the de jitter buffer 180 of the receiver 160 and the smart blanking apparatus logic block 140 coupled to the encoder 80 from the transmitter 150. The network stack 185 serves to route incoming frames to the decoder 50 of the device it is a part of, or to route frames out to the switching circuitry of another device. In a preferred embodiment, the stack 185 is an IP stack. The network stack 185 can be implemented over different channels of communication, and in a preferred embodiment the network stack 185 is implemented in conjunction with a wireless communication channel.

Since both cell phones shown in FIG. 5A can either transmit speech or receive speech, the smart blanking apparatus is broken into two blocks for each phone. As discussed below in relation to particular implementations, both the transmitter 150 and the receiver 160 of speech may execute smart blanking processes. Thus, the smart blanking apparatus 140 operably coupled to the decoder 50 executes such processes for the receiver 160, while the smart blanking apparatus 140 operably coupled connected to the encoder 80 executes such processes for the transmitter 150.

Figure 5C:
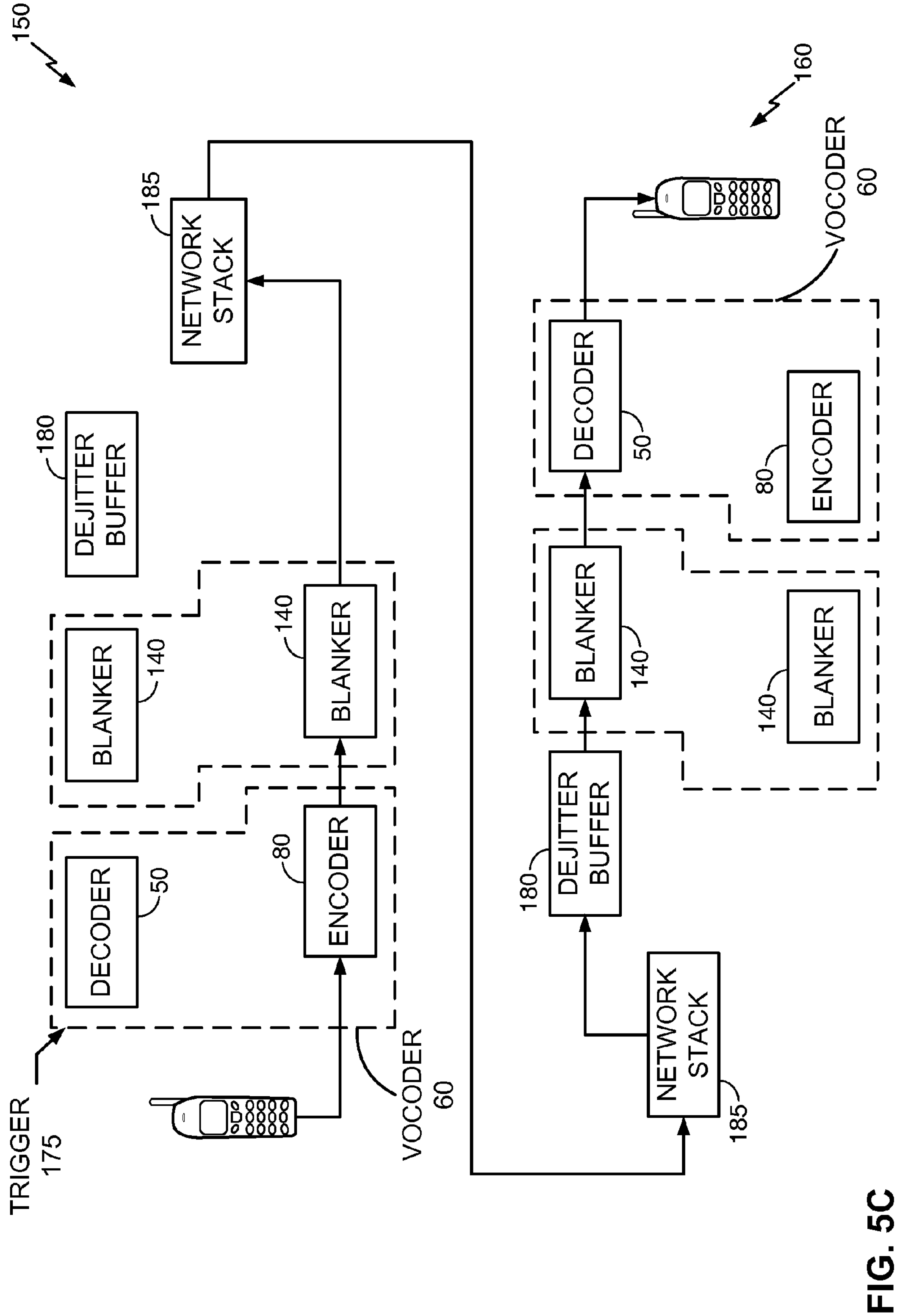
FIG. 5C is a block diagram of a system which uses smart blanking where the smart blanking apparatus comprises one block or apparatus which performs both the transmitting and the receiving steps of the present invention.

It should be pointed out that the each cell phone user both transmits speech (speaks) and receives speech (listens). Thus, the smart blanking apparatus 140 may also be one block or apparatus at each cell phone which performs both the transmitting and the receiving steps. This is illustrated in FIG. 5C. In a preferred embodiment, the smart blanking apparatus 140 is a microprocessor, or any of a number of devices, both analog and digital which can be used to process information, execute instructions, and the like.

Figure 5D:
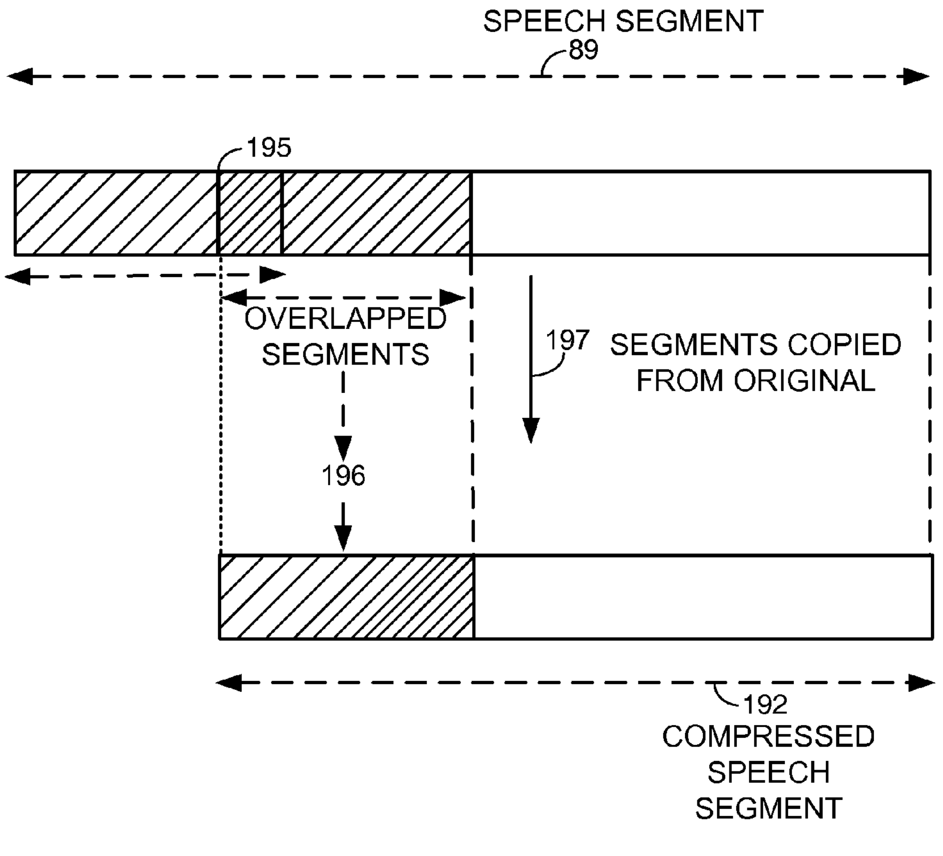
FIG. 5D is an example of a speech segment that was compressed using time warping.
Figure 5E:
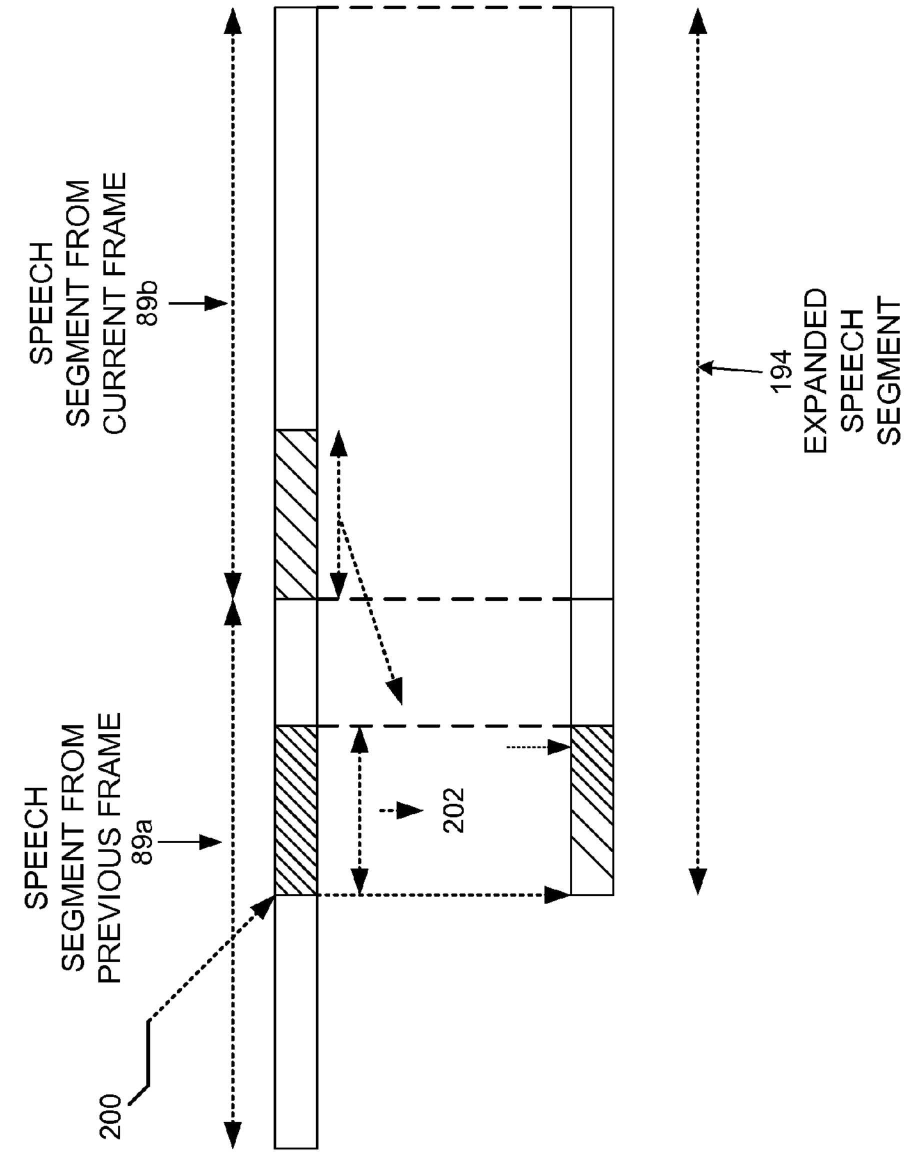
FIG. 5E is an example of a speech segment that was expanded using time warping.
Figure 5F:
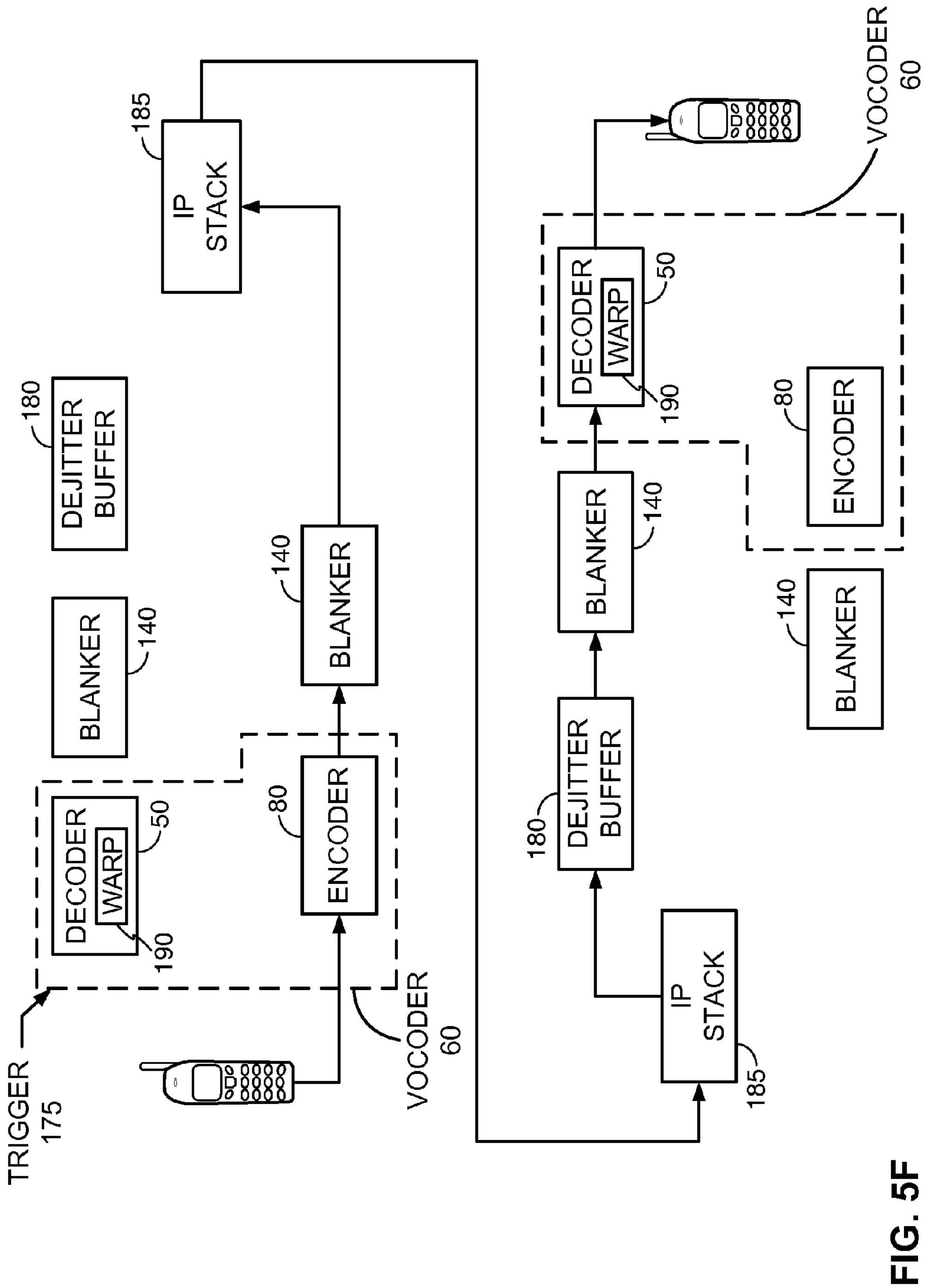
FIG. 5F is a block diagram of a system which uses smart blanking and time warping.

Further, a time warper 190 may be used with the smart blanking apparatus 140. Speech time warping is the action of expanding or compressing the duration of a speech segment without noticeably degrading its quality. Time warping is illustrated in FIG. 5D and FIG. 5E, which show examples of a compressed speech segment 192 and an expanded speech segment 194, respectively. FIG. 5F shows an implementation of an end-to-end communications system including time warper 190 functionality.

In FIG. 5D, a location 195 within a speech segment 89 where a maximum correlation is found is used as an offset. To compress the speech sample, some segments are add-overlapped 196, while the rest of the samples are copied as-is from the original segment 197. In FIG. 5E, location 200 is where the maximum correlation was found (offset). The speech segment 89*a* from the previous frame has 160 PCM samples, while the speech segment 89*b* from the current frame has 160 PCM samples. To expand the speech segment, segments are add-overlapped 202. The expanded speech segment 194 is the sum of 160 PCM samples less the number of offset samples, plus another 160 PCM samples.

Classifying 1/8 Rate Frames

1. Transitory 1/8 Rate Frames

In the illustrative embodiment, frames may be classified according to their positioning after a talk spurt. Frames immediately following a talk spurt may be termed "transitory." They may contain some remnant voice energy in addition to the background noise 89 or they may be inaccurate because of vocoder convergence operation such as, for example, when the encoder is still estimating background noise. Thus, the information contained within these frames varies from the current average volume level of the "noise." These transitory frames 205 may not be good examples of the "true background noise" during a silence period. On the other hand, stable frames 210 contain a minimal amount of voice remnant which is reflected in the average volume level.

Figure 6:
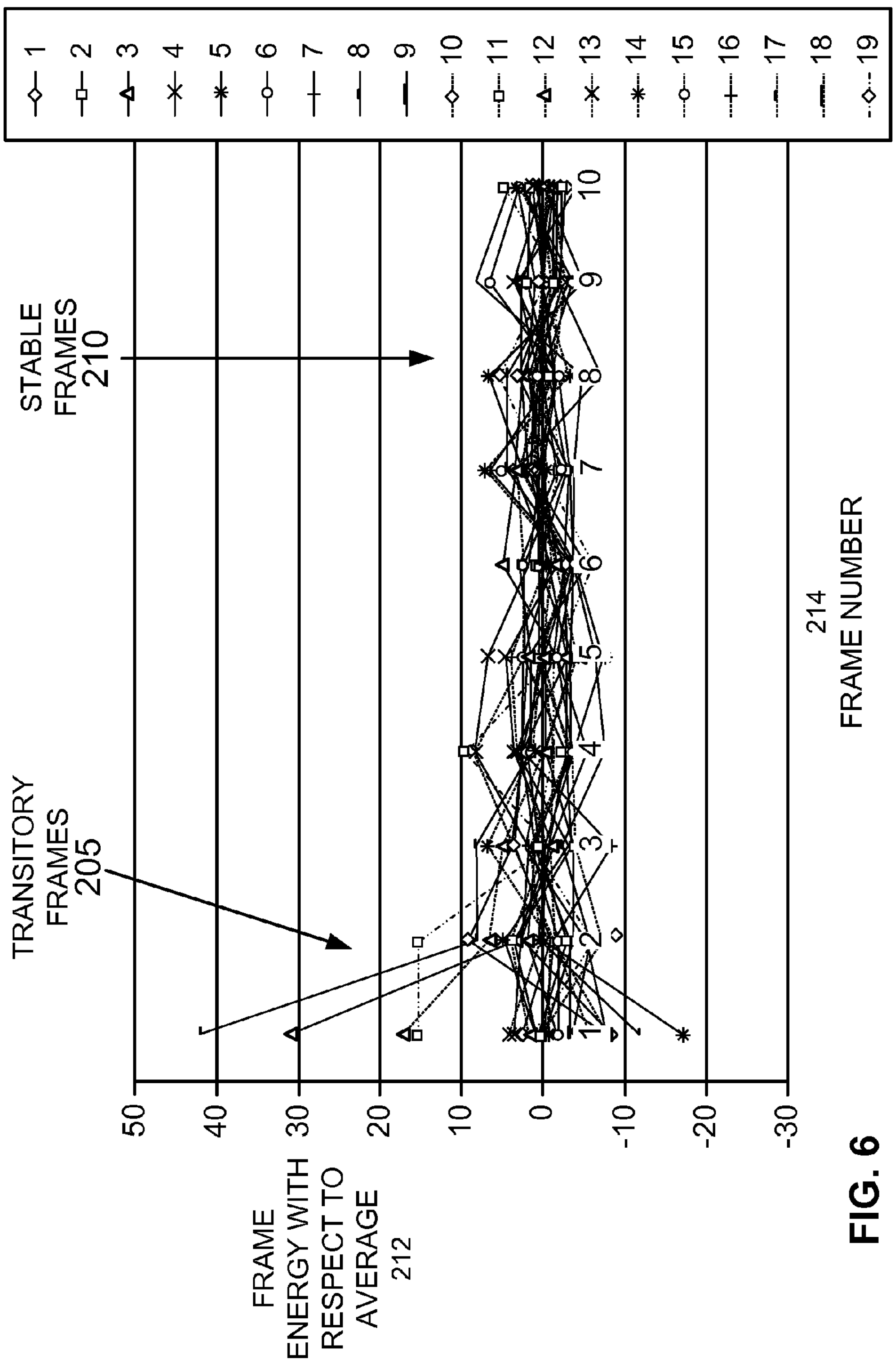
FIG. 6 plots frame energy with respect to average energy versus frame number at the beginning of silence on a computer rack.
Figure 7:
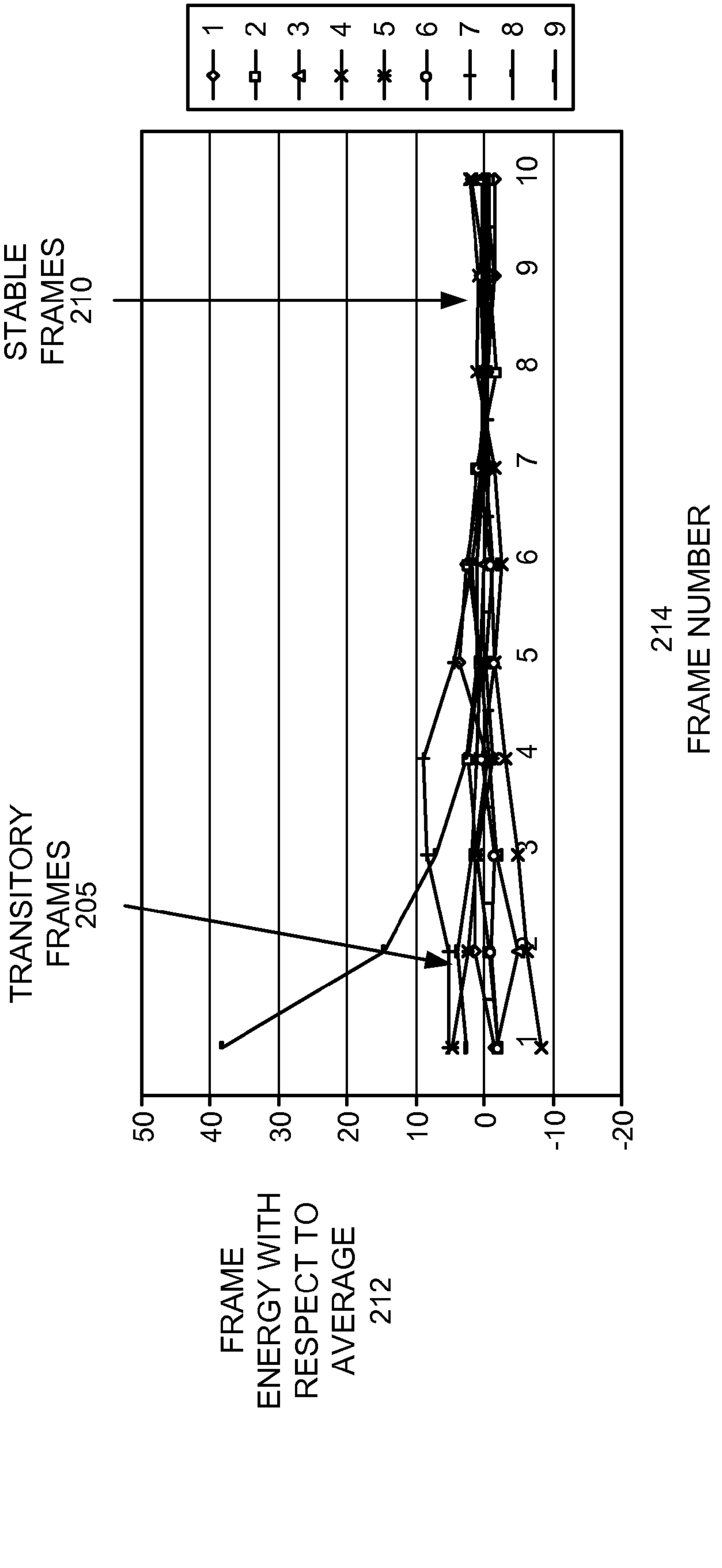
FIG. 7 plots frame energy with respect to average energy versus frame number at the beginning of silence in a windy environment.

FIG. 6 and FIG. 7 show the beginning of the silence period for two different speech environments. FIG. 6 contains nineteen plots of noise from a rack of computers in which the beginning of several silence periods are shown. Each plot represents the results from a trial. The y-axis represents frame energy delta with respect to average energy 212. The x-axis represents frame number 214. FIG. 7 contains nine plots of noise from walking on a windy day in which the beginning of silence for several silence periods is shown. The y-axis represents frame energy delta with respect to average energy 212. The x-axis represents frame number 214.

FIG. 6 shows a speech sample where the energy of the 1/8 rate frames 70 could be considered "stable" after the second frame. FIG. 7 shows that in many of the plots, the sample took more than four frames for the energy of the frame to converge to a value representative of the silence interval. When a person stops speaking, their voice does not stop abruptly but gradually falls silent. It therefore takes a few frames for the noise signal to settle to a constant value. Thus, the first few frames are transitory because they include some voice remnant or because of vocoder design.

2. Stable Noise Frames

Those frames following the "transitory" noise frames 205 during a silence interval may be termed "stable" noise frames 210. As stated above, these frames display minimal influence from the last talk spurt, and thus, provide a good representation of the sampled input background noise 89. One skilled in the art will recognize that stable background noise 35 is a relative term because background noise 35 may vary considerably.

Differentiating Transitory from Stable Frames

There are several methods for differentiating transitory 1/8 rate frames 205 from stable 1/8 rate frames 210. Two of those methods are described below.

Fixed Timer Discrimination

In one embodiment, the first N frames of a known rate may be considered transitory. For example, analysis of multiple speech segments 89 showed that there is a high probability that 1/8 rate frames 70 may be considered stable after the fifth frame. See FIGS. 6 and 7.

Differential Discrimination

In another embodiment, a transmitter 150 may store the filtered energy value of stable 1/8 rate frames 210 and use it as a reference. After a talk spurt, encoded 1/8 rate frames 70 are considered transitory until their energies fall within a delta of the filtered value. The spectrum usually is not compared because generally if the energy of the frame 70 has converged there is a high probability that its spectral information had converged too.

However, there is the probability that the background noise 35 characteristics could change substantially from one silence period to another resulting in a different filtered energy value for a stable 1/8 rate frame 210 than the one currently stored by the transmitter 150. Consequently, the energy of encoded 1/8 rate frames may not fall within a delta of the filtered value. To address this problem, a converging time-out may also be used to make the differential discrimination method more robust. Thus, the differential method may be considered an enhancement to the fixed timer approach.

Smart Blanking Method

In one embodiment, a method of blanking 1/8 data rate frames or 1/8 rate frames employing transitory frame values 205 may be used. In another embodiment, stable frame values 210 may be used. In a third embodiment, a method of blanking may employ the use of a "prototype 1/8 rate frame" 215. In this third embodiment, the prototype 1/8 data rate frame 215 is used for reproduction of the background noise 35 at the receiver side 160. As an illustration, during initialization procedures, the first transmitted or received 1/8 rate frame 70 may be considered to be the "prototype" frame 215. The prototype frame 215 is representative of the other 1/8 rate frames 70 being blanked by the transmitter 150. Whenever the sampled input background noise 89 changes, the transmitter 150 sends a new prototype frame 215 of known value to the receiver 160. Overall capacity may be increased since each user will require less bandwidth because fewer frames are sent.

Transmitter Side Smart Blanking Method

In the illustrative embodiment the transmitter side 150 transmits at least the first N transitory 1/8 rate frames 205 after a talk spurt. It then blanks the remaining 1/8 rate frames 70 in the silence interval. Test results indicate that sending just one frame produces good results and sending more than one frame improves quality insignificantly. In another embodiment, subsequent transitory frames 205, in addition to the first one or two, may be transmitted.

For operation in unreliable channels (High PER), the transmitter 150 can send the prototype 1/8 rate frame 215 after sending the last transitory 1/8 rate frame 205. In a preferred embodiment, the prototype frame 215 is sent (40 to 100 milliseconds) after the last transitory 1/8 rate frame 205. In one embodiment, the prototype frame 215 is sent 80 milliseconds after the last transitory 1/8 rate frame 205. This delayed transmission has the goal of improving the reliability of the receiver 160 to detect the beginning of a silence period, and transition to the silence state.

In the illustrative embodiment, during the rest of the silence interval, the transmitter 150 sends a new prototype 1/8 rate frame 215 if an update of the background noise 35 has been triggered and if the new prototype 1/8 rate frame 215 is different than the last one sent. Thus, unlike the systems disclosed in the prior art in which the 1/8 frame 70 is transmitted every 20 milliseconds, the present invention transmits the 1/8 frame 70 when the sampled input background noise 89 has changed enough to have an impact in perceived conversation quality and trigger the transmission of a 1/8 frame 70 for use at the receiver 160 to update the background noise 35. Thus, the 1/8 rate frame 70 is transmitted when needed, producing a huge savings in bandwidth.

Figure 8:
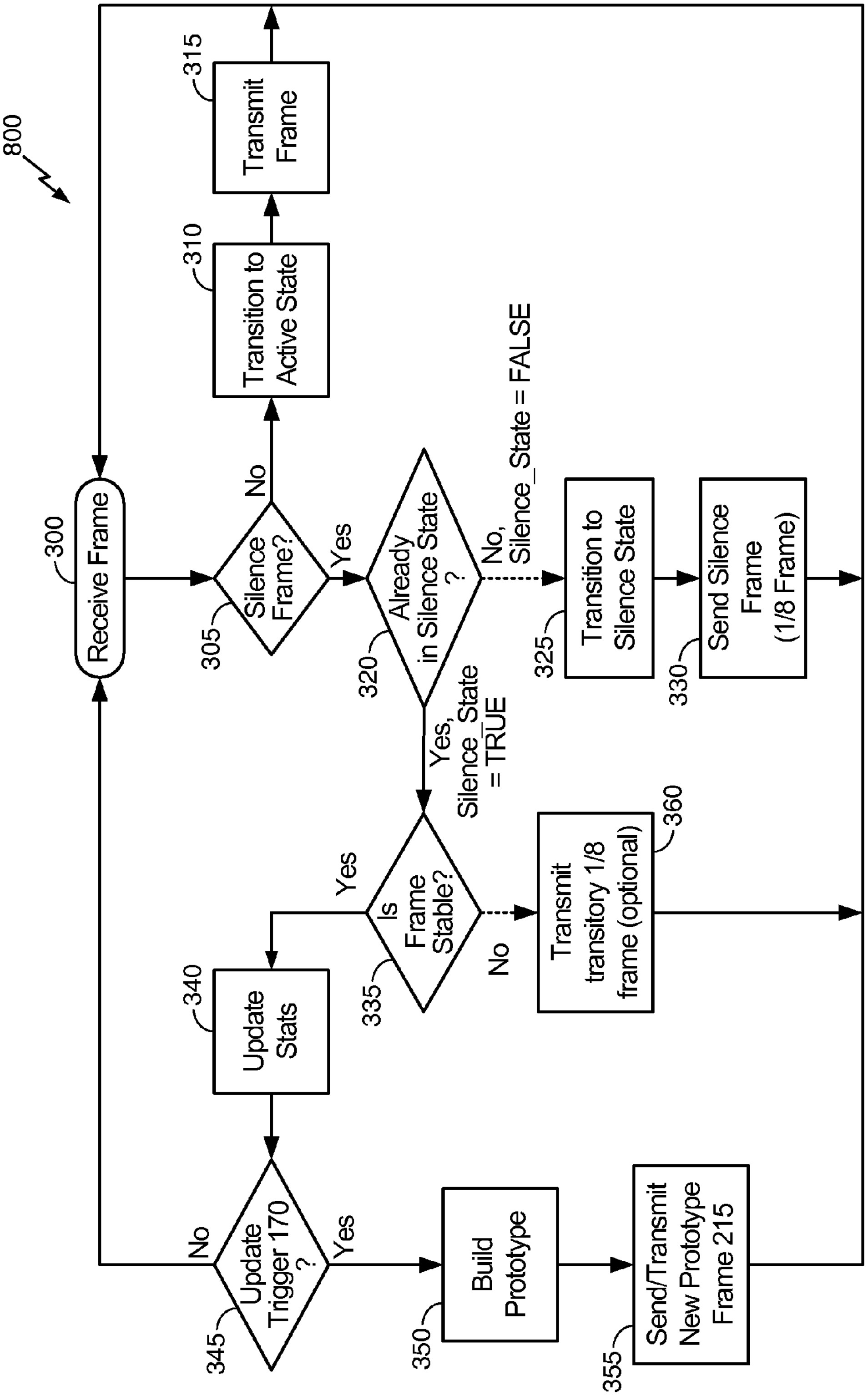
FIG. 8 is a flowchart illustrating a smart blanking method executed by a transmitter.

FIG. 8 is a flowchart illustrating a smart blanking process 800 executed by the transmitter of some embodiments. The process 800 illustrated in FIG. 8 may be stored as instructions in software or firmware 220 located in memory 130. The memory 130 can be located in a smart blanking apparatus 140, or separately from the smart blanking apparatus 140.

In FIG. 8, the transmitter receives a frame (at the step 300). Next, the receiver determines whether the frame is a silence frame (at the step 305). If a frame communicating or containing silence is not detected, e.g., it is a voice frame, the system transitions to active state (at the step 310) and the frame is transmitted to the receiver (at the step 315).

If the frame is a silence frame, then the system checks whether it is in a silence state (at the step 320). If the system is not in a silence state, such as, for example, when silence state=false, the system transitions to a silence state at the step 325 and sends a silence frame to the receiver (at the step 330). If the system is in a silence state, e.g., when silence state=true, the system checks whether the frame is stable or not (at the step 335).

If the frame is a stable frame 210 (at the step 335), the system updates statistics (at the step 340) and checks to see if an update 212 is triggered (at the step 345). If an update 212 is triggered, the system builds a prototype (at the step 350) and sends a new prototype frame 215 to the receiver 160 (at the step 355). If an update 212 is not triggered, the transmitter 150 will not send a frame to the receiver 160 and returns to the step 300 to receive a frame.

If the frame is not stable (at the step 335), the system may transmit transitory 1/8 rate frames 205 (at the step 360). However, this feature is optional.

Receiver Side Smart Blanking

In the illustrative embodiment, on the receiver side 160, the smart blanking apparatus 140 keeps track of the state of the conversation. The receiver 160 may provide the received frames to a decoder 50 as it receives the frames. The receiver 160 transitions to silence state when a 1/8 rate frame 70 is received. In another embodiment, transition to silence state by the receiver 160 may be based on a time out. In yet another embodiment, transition to silence state by the receiver 160 may be based on both the receipt of a 1/8 rate 70 and on a time out. The receiver 160 may transition to active state when a rate different than a 1/8 rate is received. For example, the receiver 160 may transition to an active state either when a full rate frame or a half rate frame is received.

In the illustrative embodiment, when the receiver 160 is in the silence state, it may play back the prototype 1/8 rate frame 215. If a 1/8 rate frame is received during silence state, the receiver 160 may update the prototype frame 215 with the received frame. In another embodiment, when the receiver 160 is in the silence state, if no 1/8 rate frame 70 is available, the receiver 160 may play the last received 1/8 rate frame 70.

Figure 9:
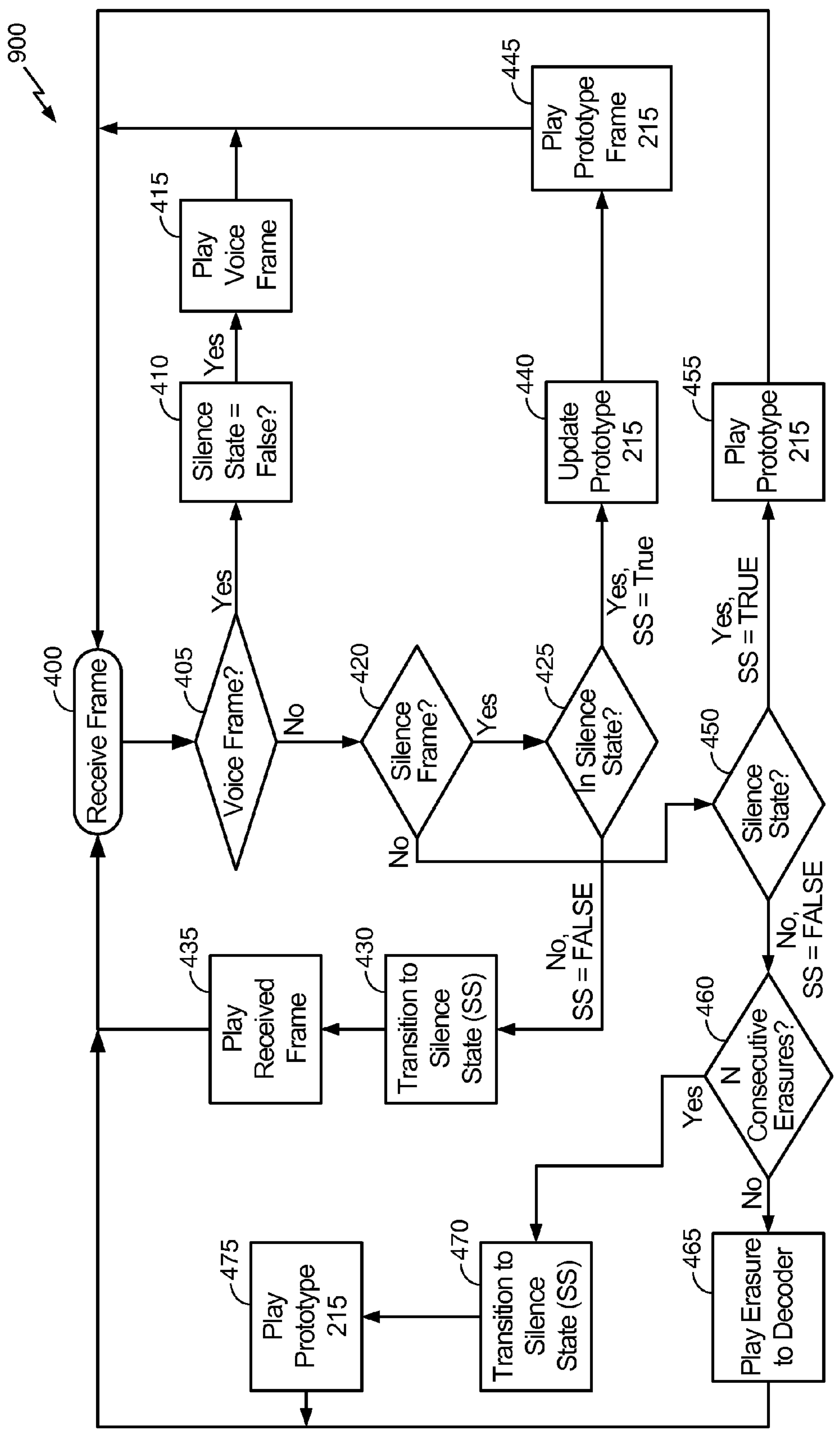
FIG. 9 is a flowchart illustrating a smart blanking method executed by a transmitter.

FIG. 9 is a flowchart illustrating a smart blanking process 900 executed by the receiver 160. The process 900 illustrated in FIG. 9 may be stored as instructions 230 located in software or firmware 220 located in memory 130. The memory 130 may be located in a smart blanking apparatus 140 or separately. Furthermore, many of the steps of the smart blanking process 900 may be stored as instructions located in software or firmware located in memory 130.

The receiver 160 receives a frame (at the step 400). First, it determines if it's a voice frame (at the step 405). If it is, yes, then it sets its silence state=false (at the step 410), then the receiver plays the voice frame (at the step 415). If the received frame is not a voice frame, then the receiver 160 checks if it is a silence frame (at the step 420). If the answer is yes, the receiver 160 checks if the state is a silence state (at the step 425). If the receiver 160 detects a silence frame, but the silence state is false, e.g., the receiver 160 is in the voice state, the receiver 160 transitions to a silence state (at the step 430) and plays the received frame (at the step 435). If the receiver 160 detects a silence frame, and the silence state is true, the receiver updates the prototype frame 215 (at the step 440) and plays the prototype frame 215 (at the step 445).

As stated above, if the received frame is not a voice frame, then the receiver 160 checks if it is a silence frame. If the answer is no, then no frame was received (e.g. it is an erasure indication) and the receiver 160 checks if the state is a silence state (at the step 450). If the state is silence, e.g., silence state=true, a prototype frame 215 is played (at the step 455). If the state is not silence, e.g., silence state=false, the receiver 160 checks if N consecutive erasures 240 have occurred (at the step 460). (In smart blanking, an erasure 240 is essentially a flag. Erasures 240 may be substituted by the receiver when a frame is expected, but not received). If the answer is no, then N consecutive erasures 240 have not occurred and the smart blanking apparatus 140 coupled to the decoder 50 in the receiver 160 plays an erasure 240 to the decoder 50 (at the step 465) (for packet loss concealment). If the answer is yes, N consecutive erasures 240 have occurred, the receiver 160 transitions to the silence state (at the step 470) and plays a prototype frame 215 (at the step 475).

In one embodiment, the system in which the smart blanking apparatus 140 and method is used is a Voice over IP system where the receiver 160 has a flexible timer and the transmitter 150 uses a fixed timer which sends frames every 20 milliseconds. This is different from a circuit based system where both the receiver 160 and transmitter 150 use a fixed timer. Thus, since a flexible timer is used, the smart blanking apparatus 140 may not check for a frame every 20 milliseconds. Instead, the smart blanking apparatus 140 will check for a frame when asked to do so.

As stated earlier, when time warping is used, a speech segment 89 can be expanded or compressed. The decoder 50 may run when the speaker 235 is running out of information to play back. If the decoder 50 needs to run it will try to get a new frame from the de jitter buffer 180. The smart blanking method is then executed.

Figure 10:
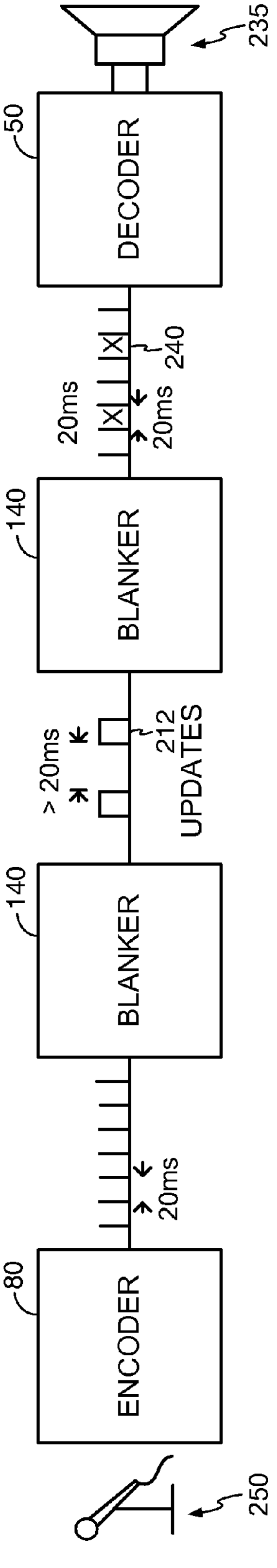
FIG. 10 illustrates the transmitting of update frames and playing of erasures.

FIG. 10 shows that 1/8 rate frames 70 are continuously sent by the encoder 80 to the smart blanking apparatus 140 in the transmitter 150. Likewise, 1/8 rate frames 70 are continuously sent by the smart blanking apparatus 140 operably coupled to the decoder 50 in the receiver 160. However, between the receiver 160 and transmitter 150 a continuous train of frames are not sent. Instead, updates 212 are sent when needed. The smart blanking apparatus 140 can play erasures 240 and play prototypes frames 215 when no frame is received from the transmitter 150. A microphone 250 is attached to the encoder 80 in the transmitter 150 and a speaker 235 is attached to the decoder 50 in the receiver 160.

Flatness of Background Noise

In the illustrative embodiment, when the decoder 50 detects a 1/8 rate frame 70, the receiver 160 may use only one 1/8 rate frame 70 to reproduce background noise 35 for the entire silence interval. In other words, the background noise 35 is repeated. If there is an update 212, the same updated 1/8 rate frame 212 is sent every 20 milliseconds to generate background noise 35. This may lead to an apparent lack of variance or "flatness" of the reconstructed background noise 35 since the same 1/8 rate frame may be used for extended periods of time and may be bothersome to the listener.

In one embodiment, to avoid "flatness," erasures 240 may be fed into a decoder 50 at the receiver 160 instead of the prototype 1/8 rate frame 215. This is illustrated in FIG. 10. The erasure 212 introduces randomness to the background noise 35 because the decoder 50 tries to reproduce what it had prior to the erasure 212 thereby varying the reconstructed background noise 35. Playing an erasure 212 between 0 and 50% of the time will produce the desired randomness in the background noise 35.

Figure 11:
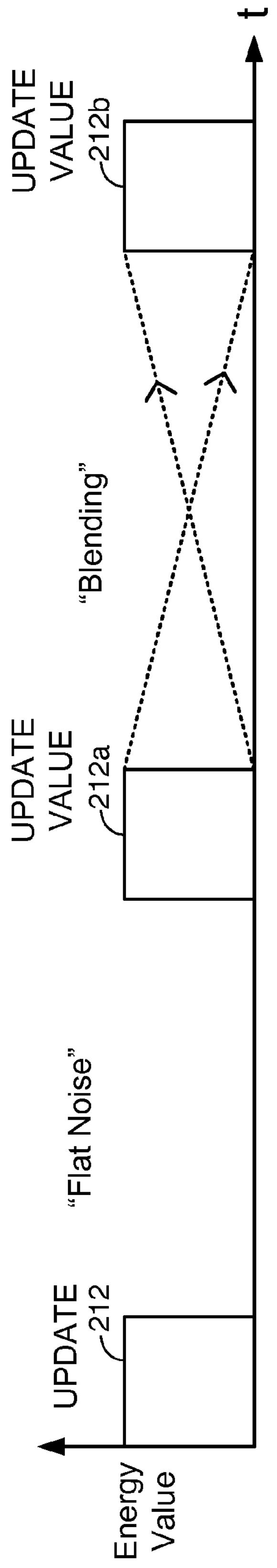
FIG. 11 is a plot of energy value versus time in which a prior 1/8 rate frame update is blended with a subsequent 1/8 rate frame update.

In another embodiment, random background noise 35 may be "blended" together. This involves blending a prior 1/8 rate frame update 212*a* with a new or subsequent 1/8 rate frame update 212*b*, gradually changing the background noise 35 from the prior 1/8 frame update value 212*a* to the new 1/8 frame update value 212*b*. Thus, a randomness or variation is desirably added to the background noise 35. As shown, the background noise energy level can gradually increase (arrow pointing upward from prior 1/8 frame update value 212*a* to the new 1/8 frame update value 212*b*) or decrease (arrow pointing downward from prior 1/8 frame update value 212*a* to the new 1/8 frame update value 212*b*) depending on if the energy value in the new update rate frame 212*b* is greater or less than the energy value in the prior rate update frame 212*a*. This is illustrated in FIG. 11.

Figure 12:
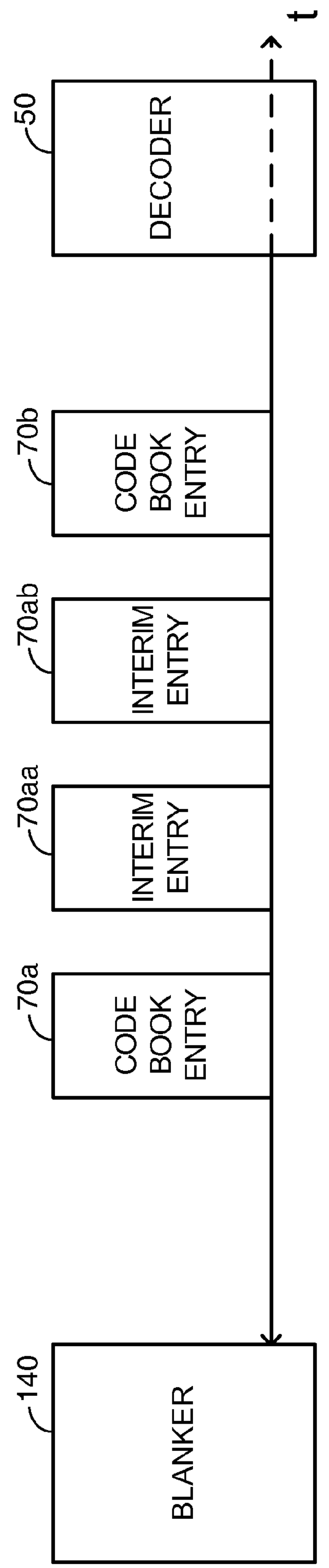
FIG. 12 illustrates blending a prior 1/8 rate frame update with a subsequent 1/8 rate frame update using codebook entries.

This gradual change in background noise 35 can also be accomplished using codebook entries 70*a*, 70*b* in which the frames sent take on codebook entry values that lie between the prior 1/8 frame update value 212*a* and the new 1/8 frame update value 212*b*, gradually moving from the prior codebook entry 70*a* representing the prior 1/8 update frame 212*a* to the codebook entry 70*b* representing the new update frame 212*b*. Each interim codebook entry 70*aa*, 70*ab* is chosen to mimic an incremental change, Δ, from the prior 212*a* to the new update frame 212*b*. For example, in FIG. 12, the prior 1/8 data rate update frame 212*a* is represented by codebook entry 70*a*. The next frame is represented by the interim codebook entry 70*aa*, which represents an incremental change, Δ, from the prior codebook entry 70*a*. The frame following the frame with the first incremental change is represented by the interim codebook entry 70*ab*, which represents an incremental change of 2Δ from the prior codebook entry 70*a*. FIG. 12 shows that the interim codebook entries 70*aa*, 70*ab* having an incremental change from the prior update 212*a* are not sent from the transmitter 150, but are transmitted from the smart blanking apparatus 140 operably coupled to the decoder 50 in the receiver 160. The interim entries are not sent by the transmitter 150, and advantageously there is a reduction in updates 212 sent by the transmitter 150. The incremental changes are not transmitted. They are automatically generated in the receiver between two consecutive updates to smooth transition from one background noise 35 to another.

Triggering a 1/8 Rate Prototype Update

In the illustrative embodiment, a transmitter 150 sends an update 212 to the receiver 160 during a silence period if an update of the background noise 35 has been triggered and if the new 1/8 rate frame 70 contains a different noise value than the last one sent. This way, background information 35 is updated when required. Triggering may be dependent on several factors. In one embodiment, triggering may be based on a difference in frame energy.

Figure 13:
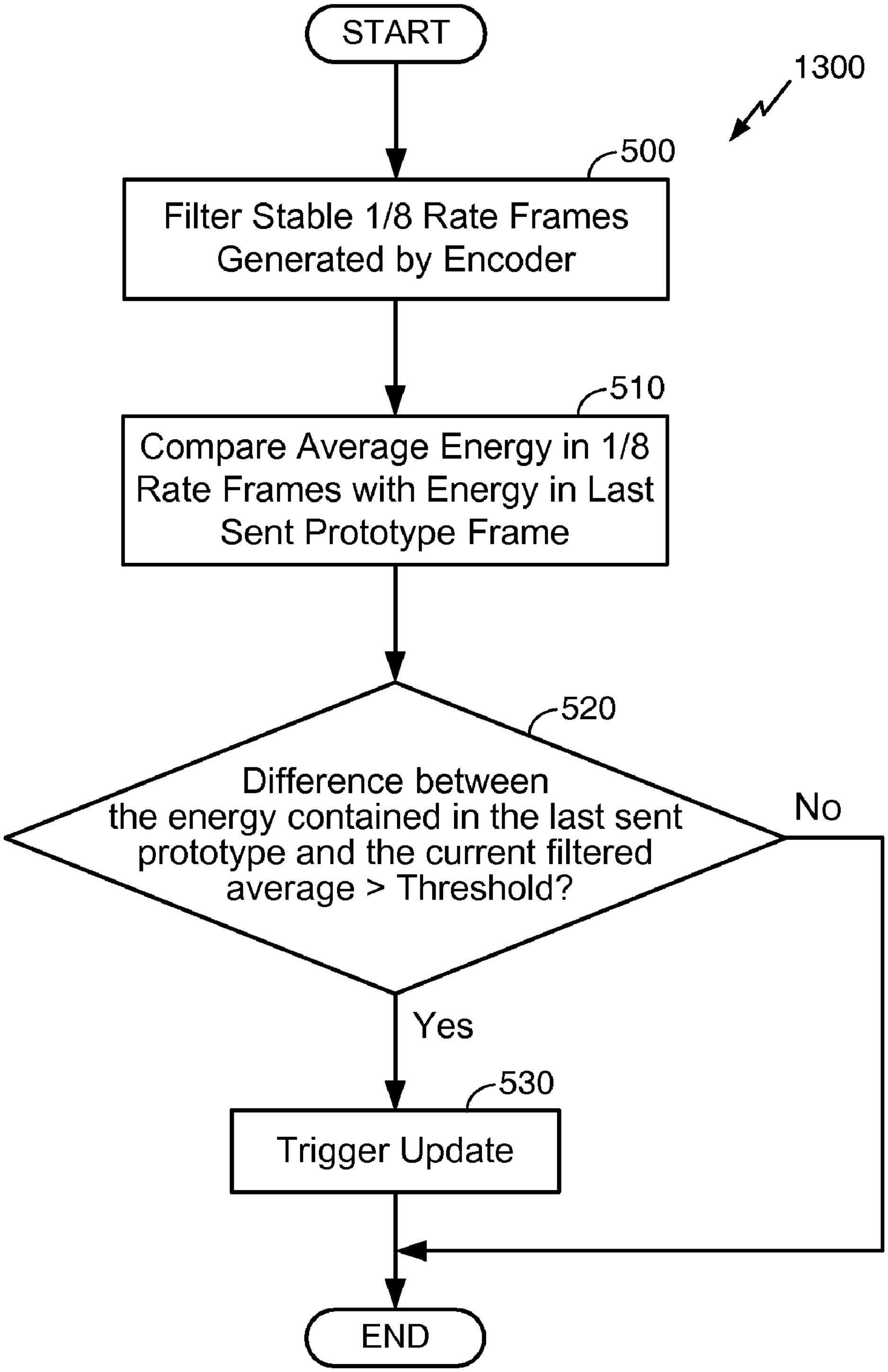
FIG. 13 is a flowchart which illustrates triggering a 1/8 rate frame update based on a difference in frame energy.

FIG. 13 illustrates process 1300 in which triggering may be based on a difference in frame energy. In this embodiment, the transmitter 150 keeps a filtered value of the average energy of every stable 1/8 rate frame 210 produced by the encoder 80 (at the step 500). Next, the energy contained in the last sent prototype 215 and the current filtered average energy of every stable 1/8 data rate frames are compared (at the step 510). Next, it is determined if the difference or delta between the energy contained in the last sent prototype 215 and the current filtered average is greater than a threshold 245 (at the step 520). If the answer is yes, an update 212 is triggered and a new 1/8 rate frame 70 containing a new noise value is transmitted (at the step 530). A running average of the background noise 35 is used to calculate the difference to avoid a spike from triggering the transmission of an update frame 212. The difference used can either be fixed or adaptive based on quality or throughput. After the step 530, the process 1300 concludes.

Figure 14:
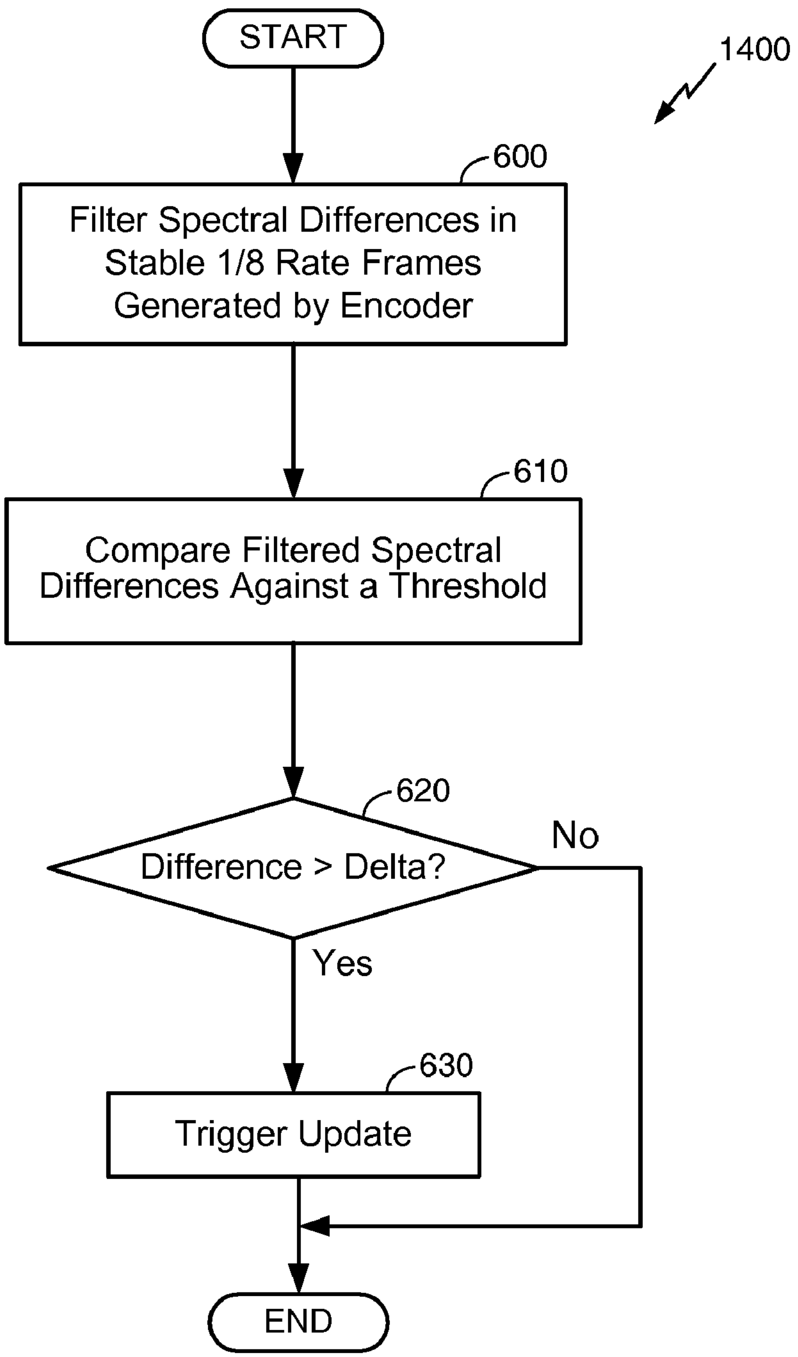
FIG. 14 is a flowchart which illustrates triggering a 1/8 rate frame update based on a difference in frequency energy.

In another embodiment, triggering may be based on a spectral difference. Such an embodiment is illustrated by the process 1400 of FIG. 14, which begins at the step 600. In this embodiment, the transmitter 150 keeps a filtered value per codebook 65 of the spectral differences between the codebook entries 71, 73 contained in the stable 1/8 rate frames 210 produced by the encoder 80 (at the step 600). Next, this filtered spectral difference is compared against a threshold (at the step 610). Then, it is determined if the difference or delta between the spectrum of the last transmitted prototype 215 and the filtered spectral differences between the codebook entries 71, 73 contained in the stable 1/8 rate frames 210 is greater than its threshold (SDT1 and SDT2) 235 (at the step 620). If it is greater than the threshold 235, an update 212 is triggered (at the step 630). After the step 630, the process 1400 concludes.

As stated above, both changes in background noise 35 volume or energy and changes in background noise 35 frequency spectrum can be used as a trigger 175. In previously run trials of the smart blanking method and apparatus, two decibel (2 db) changes in volume have triggered update frames 212. Also, variation in frequency spectrum of 40% has been used to trigger frequency changes 212.

Calculating Spectral Differences

As stated earlier a Linear Prediction Coefficient (LPC) filter (or Linear Predictive Coding filter) is used to extract the frequency characteristics of the background noise 35. Linear predictive coding is a method of predicting future samples of a sequence by a linear combination of the previous samples of the same sequence. Spectral information is usually encoded in a way that the linear differences of the coefficients 72 produced by two different codebooks 65 are proportional to the codebooks' 65 spectral differences. The model parameter estimator 100 shown in FIG. 3 performs LPC analysis to produce a set of linear prediction coefficients (LPC) 72 and the optimal pitch delay (τ). It also converts the LPCs 72 to line spectral pairs (LSPs). Line spectral pair (LSP) is a representation of digital filter coefficients 72 in a pseudo-frequency domain. This representation has good quantization and interpolation properties.

In the illustrative embodiment implementing an ECRV vocoder 60, the spectral differences can be calculated using the following two equations.

$$\Delta LSPIDX1[n, m] = \sum_{i=1}^{5} \text{abs}(q_{rate}(1, i, n) - q_{rate}(1, i, m))$$

$$\Delta LSPIDX2[n, m] = \sum_{i=1}^{5} \text{abs}(q_{rate}(2, i, n) - q_{rate}(2, i, m))$$

In the above equations, LSPIDX1 is a codebook 65 containing "low frequency" spectral information and LSPIDX2 is a codebook 65 containing "high frequency" spectral information. The values n and m are two different codebook entries 71. The value $q_{rate}$ is a quantized LSP parameter. It has three indexes, k, i, j. The value k is the table number that changes for LSPIDX1 and LSPIDX2, where k=1, 2. i is one quantized element that belongs to the same codebook entry 71, where k=1, 2, 3, 4, 5. The value j is the codebook entry 71, e.g., the number that is actually transmitted over the communication channel. The value j corresponds to m and n. The values m and n are used in the above equations instead of j because two variables are needed since the difference between two codebooks is being calculated. In FIG. 4, codebooks LSPIDX1 and LSPIDX2 are represented by the codebook entries 71 and codebook FGIDX is represented by the codebook entries 73.

Each codebook entry 71 decodes to five numbers. To compare the two codebook entries 71 from different frames, the sum of the absolute difference of each of the five numbers is taken. The result is the frequency/spectral "distance" between these two codebook entries 71.

Figure 15:
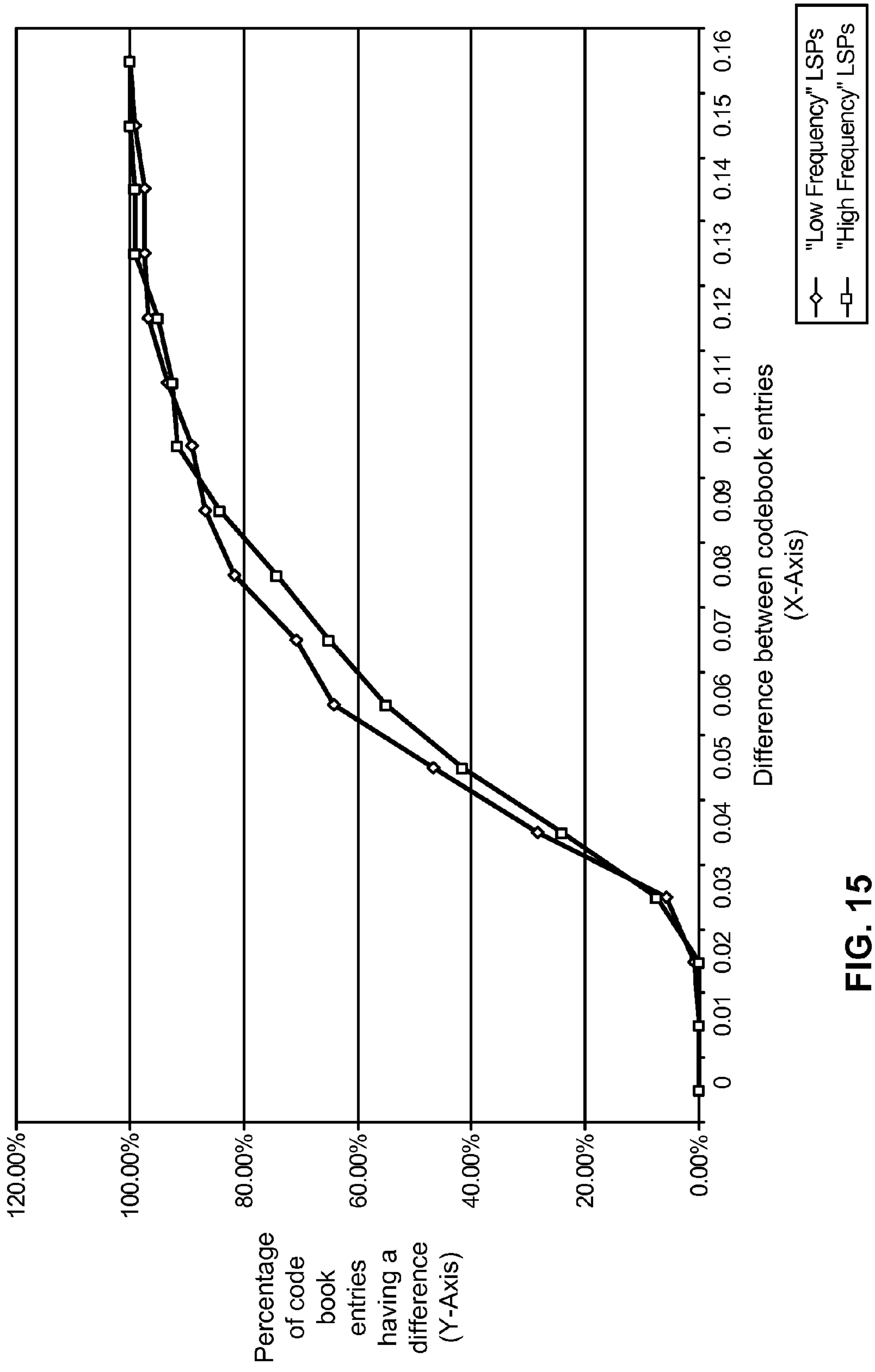
FIG. 15 is a plot of LSP spectral differences which shows the variation of frequency spectrum codebook entries for "Low Frequency" LSPs and "High Frequency" LSPs.

The variation of frequency spectrum codebook entries 71 for "Low Frequency" LSPs and "High Frequency" LSPs is plotted in FIG. 15. The x-axis represents the difference between codebook entries 71. The y-axis represents the percentage of codebook entries 71 having a difference represented on the x-axis.

Building a New Prototype 1/8 Rate Frame

When an update is required, a new prototype 1/8 rate frame 70 may be built based on the information contained in a codebook 65. FIG. 4 illustrates a 1/8 frame 70 containing entries from the three codebooks 65 discussed earlier, FGIDX, LSPIDX1, and LSPIDX2. While building a new prototype frame 215, the selected codebooks 65 may be used to represent the current background noise 35.

In one embodiment, the transmitter 150 keeps a filtered value of the average energy of every stable 1/8 rate frame 210 produced by the encoder 80 in an "energy codebook" 65 such as a FGIDX codebook 65 stored in memory 130. When an update is required, the average energy value in the FGIDX codebook 65 closest to the filtered value is transmitted to the receiver 160 using the prototype 1/8 rate frame 215.

In another embodiment, a transmitter 150 keeps a filtered histogram of the codebooks 65 containing spectral information, generated by an encoder 80. The spectral information may be "low frequency" or "high frequency" information, such as a LSPIDX1 (low frequency) or LSPIDX2 (high frequency) codebook 65 stored in memory 130. For a 1/8 rate frame update 212, the "most popular" codebook 65 is used to produce an updated value for the background noise 35 by selecting an average energy value in the spectral information codebook 65 whose histogram is closest to the filtered value.

By keeping a histogram of the last N codebook entries 71, some embodiments avoids having to calculate a codebook entry 71 which represents the latest average of the 1/8 rate frames. This represents a reduction in operating time.

Trigger Thresholds

A set of thresholds 245 that trigger prototype updates may be set up in several ways. These methods include but are not limited to using "fixed" and "adaptive" thresholds 245. In an embodiment implementing a fixed threshold, a fixed value is assigned to the different thresholds 245. This fixed value may target a desired tradeoff between overhead and background noise quality. In an embodiment implementing an adaptive threshold, a control loop may be used for each of the thresholds 245. The control loop targets a specific percentage of updates 212 triggered by each of the thresholds 245.

The percentage used as targets may be defined with the goal of not exceeding a target global overhead. This overhead is defined as the percentage of updates 212 that are transmitted over the total number of stable 1/8 rate frames 210 produced by the encoder 80. The control loop will keep track of a filtered overhead per threshold 245. If the overhead is above the target it would increase the threshold 245 by a delta, otherwise it decreases the threshold 245 by a delta.

Keep Alive Packet Trigger

Figure 16:
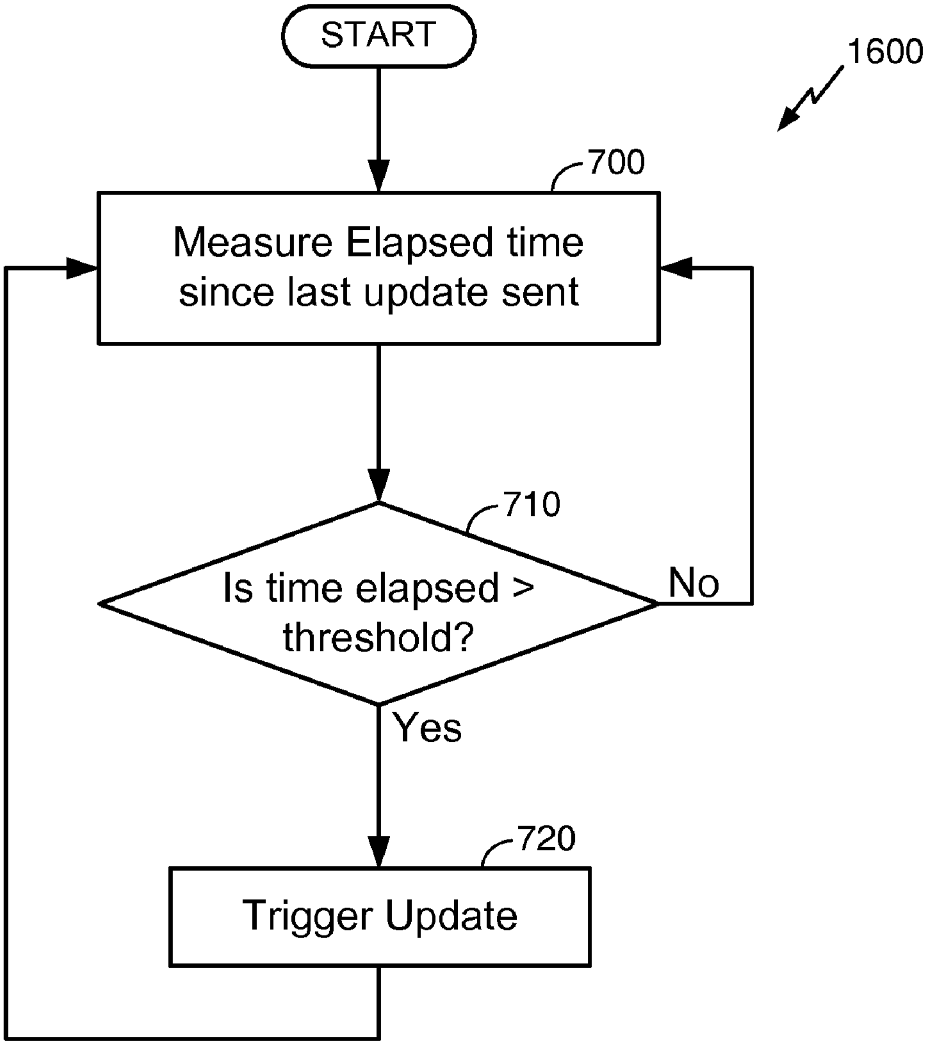
FIG. 16 is a flowchart illustrating a process for sending a keep alive packet.

If the period of time in which a packet is not sent exceeds a threshold time, the network upon which communication is taking place or the application implementing the voice communication can become confused and think that communication between the two parties has terminated. It will then disconnect the two parties. To avoid this situation from occurring, a keep alive packet is sent before the threshold time has expired to update the prototype. Such a process 1600 is illustrated in FIG. 16. As shown in this figure, the process 1600 begins by measuring elapsed time since the last update 212 was sent (at the step 700). Once the elapsed time is measured, it is determined whether the elapsed time is greater than a threshold 245 (at the step 710). If the elapsed time is greater than the threshold 245, then an update 212 is triggered (at the step 720). If (at the step 710), the elapsed time is not greater than the threshold 245, then the process 1600 returns to the step 700, to continue measuring the elapsed time.

Initialization

Figure 17:
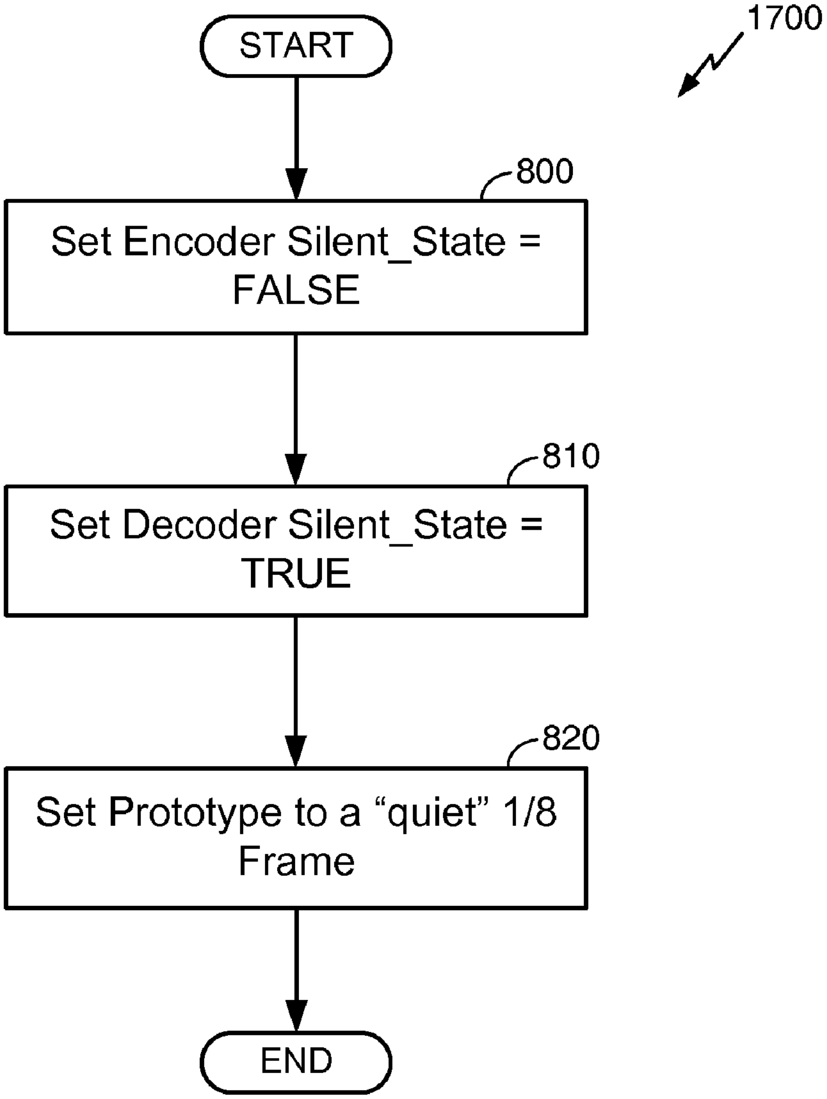
FIG. 17 is a flowchart illustrating initialization of an encoder and a decoder located in a vocoder.

FIG. 17 is a flowchart illustrating a process 1700 executed when the encoder 80 and the decoder 50 located in the vocoder 60 are initialized. The encoder 80 is initialized to the no silence or voice state, e.g., Silence_State=FALSE (at the step 800). The decoder 50 is initialized with two parameters: (i) state=silence, i.e., Silence_State=TRUE 810, and (ii) prototype is set to a quiet (low volume) frame, e.g., 1/8 frame (at the step 820). As a result, the decoder 50 initially outputs background noise. The reason is that when a call is initiated, the transmitter will send no information until the connection is completed but the receiver party needs to play something (background noise) until the connection is completed.

Additional Application for the Smart Blanking Method

The algorithm defined in this document can be easily extended to be used in conjunction with RFC 3389 and cover other vocoders not listed in this application. These include but are not limited to G.711, G.727, G.728, G.722, etc.

Those of skill in the art would understand that information and signals may be represented by using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communicating background noise between a first device and a second device, each device including circuitry for transmitting data to and receiving data from the other device, the method comprising:

generating a set of frames comprising a first frame and one or more subsequent background noise frames, the first frame used to communicate the background noise;

transmitting from the first device the background noise by using the first frame, the transmitting comprising a first data rate, wherein the transmitting further comprises:

comparing, based on a sum of absolute differences of elements of codebook entries for said plurality of background noise frames, a spectrum of a particular background noise frame to an average spectrum of a plurality of background noise frames; and transmitting an update background noise frame if a difference of the spectrums exceeds a spectrum threshold;

determining if subsequent background noise frames are stable or transitory from voice;

blanking at least one of the subsequent background noise frames based on the determination, wherein blanking comprises not transmitting a frame;

transmitting a keep alive packet before subsequent background noise frames are blanked for longer than a threshold time;

receiving a background noise frame from the second device; and updating a background noise associated with the second device.

2. The method of communicating background noise according to claim 1, further comprising filtering the background noise frames.

3. The method of communicating background noise according to claim 2, further comprising playing an erasure if no frame is received.

4. The method of communicating background noise according to claim 3, wherein said erasure is played less than or equal to 50 percent of the time.

5. The method of communicating background noise according to claim 1, further comprising playing background noise, wherein playing background noise comprises:

outputting white noise in the form of a random sequence of numbers, and extracting a frequency characteristic of said white noise.

6. The method according to claim 1, further comprising waiting until at least one of said background noise frames has been sent before sending an update background noise frame, whereby a stable background noise frame is transmitted.

7. The method according to claim 1, further comprising waiting until 40 to 100 ms after last transitory background noise frames have been sent before sending an update background noise frame, whereby a stable background noise frame is transmitted.

8. The method of communicating background noise according to claim 1, further comprising initializing an encoder and a decoder, wherein initializing an encoder and a decoder comprises:

setting a state of said encoder to a voice state;

setting a state of said decoder to a silence state; and setting a prototype to a 1/8 data rate frame.

9. The method of communicating background noise according to claim 1, further comprising blending the background noise.

10. The method of communicating background noise according to claim 9, wherein blending comprises changing said background noise gradually from a prior update value to a new update value.

11. The method of communicating background noise according to claim 1, further comprising playing an erasure if said background noise frame is not received.

12. The method of communicating background noise according to claim 11, wherein said erasure is played less than or equal to 50 percent of the time.

13. The method of communicating background noise according to claim 1, wherein updating the background noise comprises transmitting an update background noise frame having at least one codebook entry.

14. The method of communicating background noise according to claim 1, wherein receiving the background noise, comprises:

receiving a frame;

determining if said frame is a voice frame;

determining if a state is a voice state if said frame is said voice frame;

playing said frame if said state is said voice state and said frame is said voice frame;

checking if said frame is a silence frame if said frame is not said voice frame;

checking if said state is a silence state if said frame is said silence frame;

transitioning to said silence state and playing said frame if said frame is said silence frame and said state is not said silence state;

generating an update and playing said update if said frame is said silence frame and said state is said silence state;

checking if said state is said silence state if said frame not said voice frame or said silence frame;

playing a prototype frame if said state is said silence state and said frame is not said voice frame or said silence frame;

checking if N consecutive erasures have been sent if said state is not said silence state and said frame is not said voice frame or said silence frame;

playing an erasure if N consecutive erasures have not been sent, said state is not said silence state and said frame is not said voice frame or said silence frame; and transitioning to said silence state and playing said prototype frame if N consecutive erasures have been sent, said state is not said silence state and said frame is not said voice frame or said silence frame.

15. A method of operating a transmitter to communicate background noise information to a receiver over a communication channel, said method comprising:

receiving a frame;

determining if said frame is a silence frame;

transitioning to an active state and transmitting said frame if said frame is not said silence frame;

determining if a state is a silence state if said frame is said silence frame;

transitioning to said silence state and sending said silence frame to a receiver if said frame is said silence frame and said state is not in said silence state;

determining if said frame is stable or transitory from voice, if said frame is said silence frame and said state is in said silence state;

updating statistics and determining if an update was triggered if said frame is stable;

blanking silence frames based on whether they are stable or transitory from voice;

building and sending a prototype frame if said update was triggered; and, wherein the triggering comprises:

comparing, based on a sum of absolute differences of elements of codebook entries for said plurality of background noise frames, a spectrum of a particular background noise frame to an average spectrum of a plurality of background noise frames; and transmitting the prototype frame if a difference of the spectrums exceeds a spectrum threshold;

transmitting a keep alive packet before subsequent background noise frames are blanked for longer than a threshold time.

16. The method of communicating background noise according to claim 15, wherein transmitting the background noise further comprises transmitting transitory background noise frames if said frame is not stable.

17. The method of communicating background noise according to claim 15, wherein triggering further comprises:

comparing an energy of a particular background noise frame to an average energy of a plurality of said background noise frames; and transmitting the prototype frame if a difference of the energies exceeds an energy threshold and the difference of spectrums exceeds the spectrum threshold.

18. The method of communicating background noise according to claim 17, wherein said threshold is equal to or greater than 1 db.

19. The method of communicating background noise according to claim 17, wherein transmitting the prototype frame comprises transmitting at least one codebook entry.

20. The method of communicating background noise according to claim 19, wherein said at least one code book entry comprises at least one energy codebook entry, and at least one spectral code book entry.

21. The method of communicating background noise according to claim 20, wherein said update comprises a most frequently used codebook entry.

22. The method of communicating background noise according to claim 15, wherein said threshold is equal to or greater than 40 percent.

23. The method of communicating background noise according to claim 15, wherein transmitting the prototype frame comprises transmitting at least one codebook entry.

24. An apparatus for communicating background noise, comprising:

a processor;

memory in electronic communication with the processor;

instructions stored in the memory, the instructions being executable by the processor to:

generate a set of frames comprising a first frame and one or more subsequent background noise frames, the first frame used to communicate the background noise;

transmit from the first device the background noise by using the first frame, the transmitting comprising a first data rate, wherein the transmitting further comprises:

comparing, based on a sum of absolute differences of elements of codebook entries for said plurality of background noise frames, a spectrum of a particular background noise frame to an average spectrum of a plurality of background noise frames; and transmitting an update background noise frame if a difference of the spectrums exceeds a spectrum threshold;

determine if subsequent background noise frames are stable or transitory from voice;

blank at least one of the subsequent background noise frames based on the determination, wherein blanking comprises not transmitting a frame;

transmit a keep alive packet before subsequent background noise frames are blanked for longer than a threshold time;

receive a background noise frame from the second device; and update a background noise associated with the second device.

25. An apparatus for communicating background noise, comprising:

means for generating a set of frames comprising a first frame and one or more subsequent background noise frames, the first frame used to communicate the background noise;

means for transmitting from the first device the background noise by using the first frame, the transmitting comprising a first data rate, wherein the transmitting further comprises:

comparing, based on a sum of absolute differences of elements of codebook entries for said plurality of background noise frames, a spectrum of a particular background noise frame to an average spectrum of a plurality of background noise frames; and transmitting an update background noise frame if a difference of the spectrums exceeds a spectrum threshold;

means for determining if subsequent background noise frames are stable or transitory from voice;

means for blanking at least one of the subsequent background noise frames based on the determination, wherein blanking comprises not transmitting a frame;

means for transmitting a keep alive packet before subsequent background noise frames are blanked for longer than a threshold time;

means for receiving a background noise frame from the second device; and means for updating a background noise associated with the second device.

26. A non-transitory computer-readable medium comprising executable instructions for:

generating a set of frames comprising a first frame and one or more subsequent background noise frames, the first frame used to communicate the background noise;

transmitting from the first device the background noise by using the first frame, the transmitting comprising a first data rate, wherein the transmitting further comprises:

comparing, based on a sum of absolute differences of elements of codebook entries for said plurality of background noise frames, a spectrum of a particular background noise frame to an average spectrum of a plurality of background noise frames; and transmitting an update background noise frame if a difference of the spectrums exceeds a spectrum threshold;

determining if subsequent background noise frames are stable or transitory from voice;

blanking at least one of the subsequent background noise frames based on the determination, wherein blanking comprises not transmitting a frame;

transmitting a keep alive packet before subsequent background noise frames are blanked for longer than a threshold time;

receiving a background noise frame from the second device; and updating a background noise associated with the second device.

* * * * *